(12) United States Patent
Iwai

(10) Patent No.: US 6,683,703 B1
(45) Date of Patent: Jan. 27, 2004

(54) PHOTOELECTRIC TRANSDUCER AND PHOTOELECTRIC TRANSDUCING METHOD OF THE SAME

(75) Inventor: Kenichi Iwai, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/341,131

(22) PCT Filed: Nov. 6, 1998

(86) PCT No.: PCT/JP98/05007

§ 371 (c)(1),
(2), (4) Date: Jul. 13, 1999

(87) PCT Pub. No.: WO99/26406

PCT Pub. Date: May 27, 1999

(30) Foreign Application Priority Data

Nov. 13, 1997 (JP) ............................................. 9-311876

(51) Int. Cl.[7] .............................. H04N 1/40; H04N 3/14; G03B 27/52; G06K 9/36; H01L 27/00
(52) U.S. Cl. ...................... 358/461; 358/409; 358/482; 358/483; 358/443; 358/461; 382/304; 382/276; 348/316; 348/321; 250/208.1
(58) Field of Search ................. 358/483, 443, 358/409, 448, 474, 1.17, 468, 461, 524, 482; 348/311, 316, 321; 355/41; 382/303, 276, 304; 250/208.1

(56) References Cited

U.S. PATENT DOCUMENTS

| | | | | |
|---|---|---|---|---|
| 4,242,700 A | * | 12/1980 | Weimer | 348/275 |
| 4,281,254 A | * | 7/1981 | Seachman | 348/316 |
| 4,438,457 A | * | 3/1984 | Tandon et al. | 348/316 |
| 5,121,230 A | * | 6/1992 | Honma et al. | 358/500 |
| 5,285,295 A | | 2/1994 | Kai et al. | 358/482 |
| 5,317,423 A | * | 5/1994 | Harada | 358/482 |
| 6,028,299 A | * | 2/2000 | Hirama et al. | 250/208.1 |
| 6,031,638 A | * | 2/2000 | Rao et al. | 358/474 |
| 6,204,910 B1 | * | 3/2001 | Iwai | 355/41 |
| 6,259,087 B1 | * | 7/2001 | Harada | 250/214 R |

FOREIGN PATENT DOCUMENTS

| | | | |
|---|---|---|---|
| EP | 0 376 265 | 7/1990 | H04N/3/14 |
| EP | 0 473 966 | 3/1992 | 348/241 |
| EP | 0 814 426 | 12/1997 | 358/494 |
| JP | 4-78270 | 3/1992 | 358/3.01 |
| WO | 94/18789 | 8/1994 | H04N/5/35 |

* cited by examiner

Primary Examiner—Kimberly A. Williams
Assistant Examiner—Melanie Vida
(74) Attorney, Agent, or Firm—Foley & Lardner

(57) ABSTRACT

A photoelectric conversion apparatus includes a plurality of elements (D) for receiving reflected light from an object, photoelectrically converting it into image signals (OS1–OS4), and outputting the image signals, a first output buffer (121) for outputting image signals received from even elements of the plurality of elements in the line from one end to the other end, a second output buffer (122) for outputting image signals received from odd elements from one end to the other end, a third output buffer (123) for outputting image signals received from even elements from the other end to the one end, and a fourth output buffer (124) for outputting image signals received from odd elements from the other end to the one end.

7 Claims, 15 Drawing Sheets

PHOTOELECTRIC TRANSDUCER AND PHOTOELECTRIC TRANSDUCING METHOD OF THE SAME

TECHNICAL FIELD

The present invention relates to a photoelectric conversion apparatus and photoelectric conversion method of receiving, e.g., optical image information of an original and outputting an electrical signal, an image information processing apparatus and image information processing method of processing an electrical signal from the photoelectric conversion apparatus, and an image forming apparatus such as an electronic copying machine, which has the image information processing apparatus to form an image.

BACKGROUND ART

Conventionally, in controlling devices, for example, a CCD (photoelectric conversion element) for image reading in an image forming apparatus such as an electronic copying machine or a facsimile apparatus, as the read speed increases, the pixel sending frequency becomes high, and signals are more difficult to process. Hence, pixel sending in the image area of a CCD is divisionally performed for odd components (ODD) and even components (even) to realize high-speed processing.

A conventional preprocessing system for signals of two channels output from a 2-channel output CCD processes output signals from the CCD divisionally for even and odd components through one signal transmission path (processing path).

In such a preprocessing system, image signals which have undergone signal amplification processing and A/D conversion processing are input to a scanner control ASIC through two channels for even and odd components each comprising a pixel signal of 8 bits and then synthesized into one channel first. With this processing, image data of one line have the same pixel array as that of the CCD.

The image data synthesized into one channel are subjected to shading processing to correct in units of pixels the influence of deviation in density gradient of each pixel of the image data, which is generated in association with the image density, i.e., a variation in illuminance, a variation in sensitivity of each light-receiving element (e.g., a photodiode) of the CCD, and a dark current generated in the light-receiving elements of the CCD.

The shading-corrected image data are bit-inverted and directly transferred to an image processing ASIC. In the image processing ASIC, a series of data processing operations by image processing, including filtering processing, range correction processing, magnification conversion (enlargement/reduction) processing, γ correction density conversion processing, and gradation processing, are performed.

In the conventional-preprocessing system using the 2-channel output CCD, even and odd components of output signals from the CCD are processed through one signal transmission path (processing path). In this system arrangement, a factor to adversely affect the image density is only a deviation in density gradient of each pixel of the image data, which is generated in association with so-called image density, i.e., the influence of a variation in illuminance, a variation in sensitivity of each light-receiving element of the CCD, and a dark current generated in the light-receiving elements of the CCD. The influence of this deviation, can be corrected by shading processing.

However, the 2-channel-output CCD has a limitation on its processing speed and therefore cannot meet a recent requirement for high-speed processing for a large number of originals.

When a preprocessing system is constructed using a 4-channel output CCD coping with high-speed processing on the basis of the arrangement of the preprocessing system with the 2-channel output CCD, the influence of the difference in signal transmission path (processing path) due to the system arrangement or the internal, structure of the chip of the CCD or amplifier (Amp) itself, i.e., deviation in circuit characteristics on image data, i.e., the influence of linear deviation in image density on image data must be taken into consideration.

The signal output arrangements of these CCDs will be compared. The signal outputs from the conventional 2-channel output CCD will be regarded as a sequence of pixel signals corresponding to one line of the CCD. The 2-channel output CCD outputs even and odd components arrayed in order starting from the pixel signal at the left end (appropriate array for image processing). Signal output from a CCD capable of high-speed processing, i.e., a 4-channel output CCD will be regarded as a sequence of pixel signals corresponding to one line of the CCD. The 4-channel output CCD signal outputs from the 4-channel output CCD can be considered as the sequence of pixel signals corresponding to one line of the CCD. In this case, left data of even or odd components are sequentially output starting from the pixel signal at the left end, and the pixel signal at the center is finally output from the 4-channel output CCD. Right data of even or odd components are sequentially output starting from the pixel signal at the right end, and the pixel signal at the center is finally output. Hence, the signals are not arrayed in order (inappropriate array for image processing).

These problems are not posed in the conventional 2-channel system arrangement and are unique to the 4-channel system constructed aiming at high-speed processing, and an appropriate solution means is necessary. That is, additional arrangements need be provided for the 4-channel system in consideration of these problems.

As described above, when the 4-channel output CCD is used to increase the processing speed, the influence of the difference in signal transmission path (processing path) due to the system arrangement of the preprocessing system or the internal structure of the chip of the CCD or amplifier (Amp) itself, i.e., deviation in circuit characteristics, i.e., linear deviation in image density adversely affects the image data. In addition, output signals from the 4-channel output CCD are not arrayed in order.

DISCLOSURE OF INVENTION

It is an object of the present invention to provide a photoelectric conversion apparatus, photoelectric conversion method, image information processing apparatus, image information processing method, and image forming apparatus capable of correcting deviations in image data in association with image density in use of a 4-channel output CCD and arraying image data signals.

According to the present invention, there is provided a photoelectric conversion apparatus comprising: photoelectric conversion means (D), having a plurality of elements formed in a line, for receiving light reflected by an object, photoelectrically converting the light into image signals (OS1–OS4), and outputting the image signals; first output means (101, 111, 121) for outputting the image signals received from even elements of the plurality of elements in the line in the photoelectric conversion means from a first end portion to a second end portion; second output means (102, 112, 122) for outputting the image signals received from odd elements of the plurality of elements in the line in the photoelectric conversion means from the first end portion to the second end portion; third output means (101, 113, 123) for outputting the image signals received from even elements of the plurality of elements in the line in the photoelectric conversion means from the second end portion to the first end portion; and fourth output means (102, 114, 124) for outputting the image signals received from odd elements of the plurality of elements in the line in the photoelectric conversion means from the second end portion to the first end portion.

In the present invention with this structure, instead of extracting signals from the odd- and even-numbered elements of a CCD element of one line as two channel signals, the entire screen is divided into left and right areas from the center to divide signals into four channels: signals from odd-numbered elements on the left half, signals from even-numbered elements on the left half, signals from odd-numbered elements on the right half, and signals from even-numbered elements on the right half. By processing image signals photoelectrically converted as four channel signals, high-speed image conversion processing can be realized.

In addition, according to the present invention, there is also provided a photoelectric conversion apparatus comprising: photoelectric conversion means (D), having a plurality of elements formed in a line, for receiving reflected light from an object, photo-electrically converting the light into image signals (OS1–OS4), and outputting the image signals; first output means (101, 111, 121) for outputting first image signals received from even elements from a first end portion to a central portion of the plurality of elements in the line in the photoelectric conversion means; second output means (102, 112, 122) for outputting second image signals received from odd elements from the first end portion to the central portion of the plurality of elements in the line in the photoelectric conversion means; third output means (101, 113, 123) for outputting third image signals received from even elements from a second end portion to the central portion of the plurality of elements in the line in the photoelectric conversion means; fourth output means (101, 114, 124) for outputting fourth image signals received from odd elements from the second end portion to the central portion of the plurality of elements in the line in the photoelectric conversion means; first correction means (141, 142, 160) for correcting one of the first image signal from the first output means, which is located substantially at the center of the line of the photoelectric conversion means and the second image signal from the second output means, which is located substantially at the center of the line of the photoelectric conversion means so as to make the first image signal substantially equal to the second image signal; second correction means (143, 144, 160) for correcting one of the third image signal from the third output means, which is located substantially at the center of the line of the photoelectric conversion means and the fourth image signal from the fourth output means, which is located substantially at the center of the line of the photoelectric conversion means so as to make the third image signal substantially equal to the fourth image signal; and rearrangement means (165) for rearranging, by raster processing, an order of information of the first image signal, the second image signal, the third image signal, and the fourth image signal, which are corrected by the first correction means and the second correction means.

As described above, in the present invention, correction corresponding to processing unique to four channel image signals, in which photoelectric conversion is performed while dividing the entire screen into left and right areas, is performed, and correction is performed to eliminate the difference between the left and right images. In addition, by performing raster processing for the images without any difference between the left and right images, the order of image information of four channels can be rearranged in the same order as that of image information of two channels. When raster-processed signals are used, the subsequent image processing can be realized by the conventional circuit arrangement.

BEST MODE OF CARRYING OUT THE INVENTION

An embodiment of the present invention will be described below with reference to the accompanying drawings.

Figure 1:
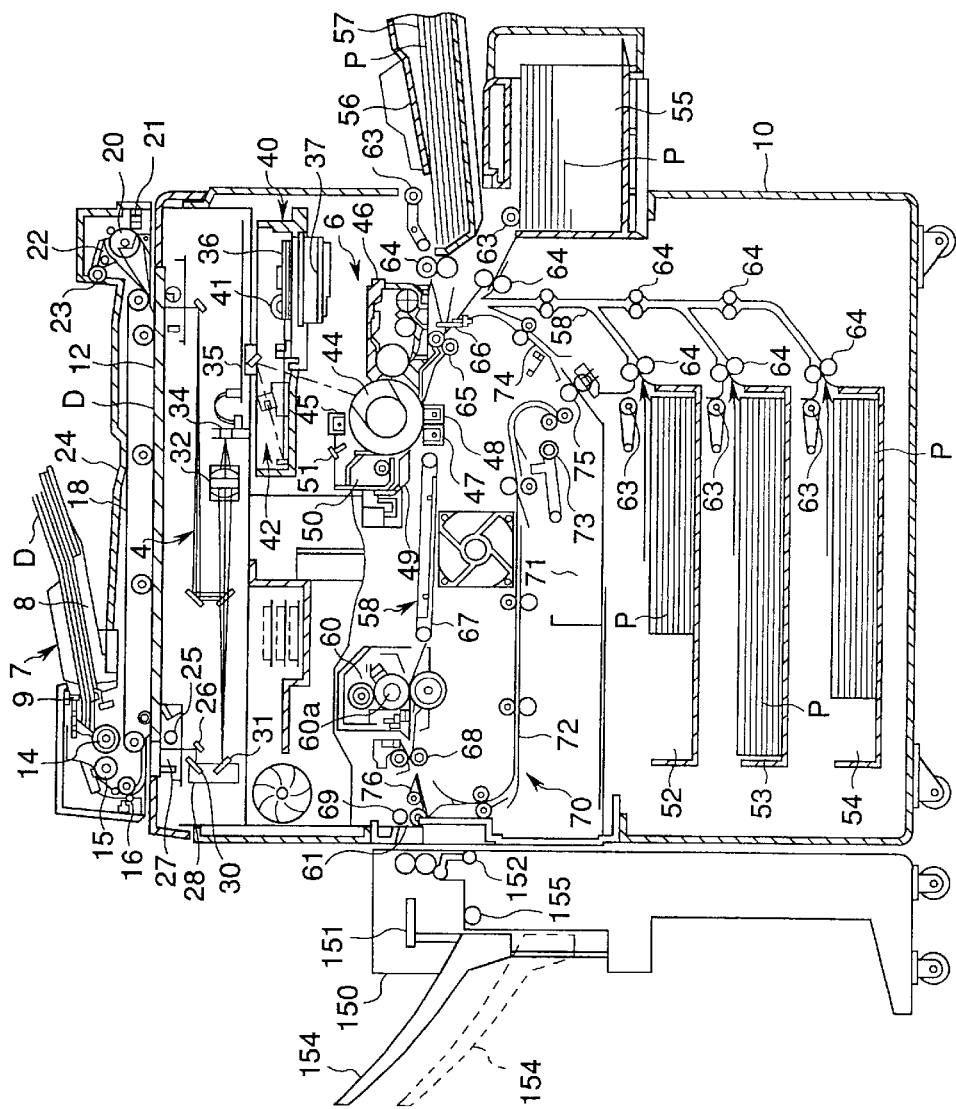
FIG. 1 is a sectional view showing the internal structure of a digital copying machine as an image forming apparatus according to the present invention.

FIG. 1 is a sectional view showing the internal structure of a digital copying machine (DPPC) using a 4-channel output CCD coping with high-speed processing, as an image forming apparatus according to the present invention.

As shown in FIG. 1, the digital copying machine has an apparatus main body 10. The apparatus main body 10 incorporates a scanner section 4 functioning as an image reading means and a printer section 6 functioning as an image forming means.

An original table 12 formed from transparent glass, on which a read object, i.e., an original D is placed, is arranged on the upper surface of the apparatus main body 10. An automatic document feeder,7 (to be referred to as an ADF hereinafter) for automatically feeding originals onto the original table 12 is disposed on the upper surface of the apparatus main body 10. The ADF 7 is arranged to be opened/closed with respect to the original table 12 and also functions as an original cover for bringing the original D placed on the original table 12 into tight contact with the original table 12.

The ADF 7 has an original tray 8 on which the original D is set, an empty sensor 9 for detecting the presence/absence of originals, pickup rollers 14 for extracting originals on the original tray 8 one by one, a feed roller 15 for conveying the extracted original, an arraying roller pair 16 for arraying the leading edges of the originals, and a conveyor belt 18 arranged to cover almost the entire surface of the original table 12. A plurality of originals set on the original tray 8 with their surfaces facing up are sequentially extracted from the lowermost page, i.e., the final page, arrayed by the arraying roller pair 16, and conveyed to a predetermined position on the original table 12 by the conveyor belt 18.

In the ADF 7, a reversing roller 20, a non-reverse sensor 21, a flapper 22, and a delivery roller 23 are disposed at the end portion on the opposite side of the arraying roller pair 16 with respect to the conveyor belt 18. The original D whose image information is read by the scanner section 4 (to be described later) is fed from the original table 12 by the conveyor belt 18 and delivered to an original delivery section 24 on the ADF 7 through the reversing roller 20, flapper 22, and delivery roller 23. To read the lower surface of the original D, the flapper 22 is switched. The original D conveyed by the conveyor belt 18 is reversed by the reversing roller 20 and fed to a predetermined position on the original table 12 again by the conveyor belt 18.

The scanner section 4 incorporated in the apparatus main body 10 has an exposure lamp 25 as a light source for illuminating the original D placed on the original table 12, and a first mirror 26 for deflecting reflected light from the original D in a predetermined direction. The exposure lamp 25 and first mirror 26 are attached to a first carriage 27 disposed under the original table 12.

The first carriage 27 is disposed to be movable in parallel to the original table 12 and reciprocally moved under the original table 12 by a scanning motor 35 (to be described later) through a toothed belt (not shown).

A second carriage 28 movable in parallel to the original table 12 is disposed under the original table 12. Second and third mirrors 30 and 31 for sequentially deflecting reflected light from the original D, which is deflected by the first mirror 26, are attached to the second carriage 28 so as to make a right angle. The second carriage 28 is moved by, e.g., the toothed belt for driving the first carriage 27 together with the first carriage 27, and moved in parallel along the original table 12 at a speed ½ that of the first carriage.

An imaging lens 32 for focusing reflected light from the third mirror 31 mounted on the second carriage 28, and a 4-channel output CCD (photoelectric conversion element) 34 for receiving the reflected light focused by the imaging lens and photoelectrically converting it are also disposed under the original table 12. The imaging lens 32 is disposed to be movable through a driving mechanism in a plane including the optical axis of the light deflected by the third mirror 31, and forms the image of the reflected light at a desired magnification by moving itself. The 4-channel output CCD 34 photoelectrically converts the incoming reflected light and outputs an electrical signal corresponding to the read original D.

On the other hand, the printer section 6 has a laser exposure unit 40 functioning as a latent image forming means. The laser exposure unit 40 comprises a semiconductor laser 41 as a light source, a polygon mirror 36 as a scanning member for continuously deflecting a laser beam emitted by,the semiconductor laser 41, a polygon motor 37 as a scanning motor for rotatably driving the polygon mirror 36 at a predetermined rotational speed (to be described later), and an optical system 42 for deflecting the laser beam from the polygon mirror and guiding the beam to a photosensitive drum 44 (to be described later). The laser exposure unit 40 having the above arrangement is permanently fixed on a support frame (not shown) of the apparatus main body 10.

The semiconductor laser 41 is ON/OFF-controlled in accordance with the image information of the original D read by the scanner section 4 or facsimile transmission/reception document information. The laser beam is directed to the photosensitive drum 44 through the polygon mirror 36 and optical system 42 to scan the outer surface of the photosensitive drum 44, thereby forming an electrostatic latent image on the outer surface of the photosensitive drum 44.

The printer section 6 has the rotatable photosensitive drum 44 as an image carrier disposed almost at the center of the apparatus main body 10. The outer surface of the photosensitive drum 44 is exposed to the laser beam from the laser exposure unit 40, so a desired electrostatic latent image is formed. Around the photosensitive drum 44, a charger 45 for applying predetermined charges to the outer surface of the drum, a developing device 46 for supplying toner as a developer to the electrostatic latent image formed on the outer surface of the photosensitive drum 44 to develop it at a desired image density, a transfer charger 48 which is integrated with a separation charger 47 for separating a target transfer material, i.e., a copy paper sheet P fed from a paper cassette (to be described later) from the photosensitive drum 44 and transfers the toner image formed on the photosensitive drum 44 to the paper sheet P, a separation gripper 49 for separating the copy paper sheet P from the outer surface of the photosensitive drum 44, a cleaning unit 50 for removing toner remaining on the outer surface of the photosensitive drum 44, and a discharger 51 for removing snow from the outer surface of the photosensitive drum 44 are sequentially arranged.

An upper cassette 52, a middle cassette 53, and a lower cassette 54 which can be pulled from the apparatus main body are stacked at the lower portion of the apparatus main body 10. These cassettes store copy paper sheets with different sizes. A large-capacity feeder 55 is arranged on one side of these cassettes. This large-capacity feeder 55 stores about 3,000 copy paper sheets P having a size with high use frequency, e.g., copy paper sheets P with A4 size. A feed cassette 57 also serving as a manual feed tray 56 is detachably attached above the large-capacity feeder 55.

A convey path 58 extending from the cassettes and large-capacity feeder 55 through a transfer section located between the photosensitive drum 44 and transfer charger 48 is formed in the apparatus main body 10. A fixing unit 60 having a fixing lamp 60a is disposed at the end of the convey path 58. A delivery port 61 is formed in the side wall of the apparatus main body 10 opposing the fixing unit 60. A single-tray finisher 150 is attached to the delivery port 61.

Pickup rollers 63 for extracting the paper sheets P one by one from the cassette or large-capacity feeder are arranged near each of the upper cassette 52, middle cassette 53, lower cassette 54, and feed cassette 57 and near the large-capacity feeder 55. A number of feed roller pairs 64 for conveying the copy paper sheet P extracted by the pickup rollers 63 through the convey path 58 are arranged in the convey path 58.

A registration roller pair 65 is arranged in the convey path 58 on the upstream side of the photosensitive drum 44. The registration roller pair 65 corrects the tilt of the extracted copy paper sheet P, matches the leading edge of the toner image on the photosensitive drum 44 with the leading edge of the copy paper sheet P, and feeds the copy paper sheet P to the transfer section at the same speed as the moving speed of the outer surface of the photosensitive drum 44. A prealigning sensor 66 for detecting arrival of the copy paper sheet P is provided on the feed roller 64 side.

Each copy paper sheet P extracted from the cassette or large-capacity feeder 55 by the pickup rollers 63 is fed to the registration roller pair 65 by the feed roller pair 64. After the leading edge of the copy paper sheet P is arrayed by the registration roller pair 65, the copy paper sheet P is fed to the transfer section.

In the transfer section, a developer image, i.e., toner image formed on the photosensitive drum 44 is transferred to the paper sheet P by the transfer charger 48. The copy paper sheet P on which the toner image is transferred is separated from the outer surface of the photosensitive drum 44 by the function of the separation charger 47 and separation gripper 49 and conveyed to the fixing unit 60 through a conveyor belt 67 constituting part of the convey path 58. After the developer image is fused and fixed on the copy paper sheet P by the fixing unit 60, the copy paper sheet P is delivered onto the finisher 150 through the delivery port 61 by a feed roller pair 68 and a delivery roller pair 69.

An automatic double-side unit 70 for reversing the copy paper sheet P which has passed through the fixing unit 60 and feeding it to the registration roller pair 65 again is arranged under the convey path 58. The automatic double-side unit 70 comprises a temporary stack 71 for temporarily stacking the copy paper sheets P, a reversing path 72 branched from the convey path 58 to reverse the copy paper sheet P which has passed through the fixing unit 60 and guide the copy paper sheet P to the temporary stack 71, pickup rollers 73 for extracting the copy paper sheets P stacked on the temporary stack one by one, and a feed roller 75 for feeding the extracted paper sheet to the registration roller pair 65 through a convey path 74. A selector gate 76 for selectively distributing the copy paper sheets P to the delivery port 61 or reversing path 72 is arranged at the branch portion between the convey path 58 and reversing path 72.

For double-side copying, the copy paper sheets P which has passed through the fixing unit 60 is guided to the reversing path 72 by the selector gate 76, temporarily-stacked on the temporary stack 71 in a reversed state, and fed to the registration roller pair 65 through the convey path 74 by the pickup rollers 73 and feed roller 75. The copy paper sheet P is arrayed by the registration roller pair 65 and fed to the transfer section again to transfer a toner image onto the blank surface of the copy paper sheet P. After this, the copy paper sheet P is delivered to the finisher 150 through the convey path 58, fixing unit 60, and delivery rollers 69.

The finisher 150 staples delivered copies of documents and stores them in units of copies. Every time a copy paper sheet P to be stapled is delivered from the delivery port 61, a guide bar 151 arrays the copy paper sheet P to the stapling side. When all paper sheets are delivered, a copy of copy paper sheets P is pressed by a paper press arm 152 and stapled by a stapler unit (not shown). After this, the guide bar 151 moves downward. The stapled copy paper sheets P are delivered to a finisher delivery tray 154 by a finisher delivery roller 155 in units of copies. The downward moving amount of the finisher delivery tray 154 is roughly determined in accordance with the number of copy paper sheets P to be delivered, so the finisher delivery tray 154 moves downward stepwise every time one copy is delivered. The guide bar 151 for arraying the delivered copy paper sheets P is located at a position where the guide bar 151 does not abut against the already stapled copy paper sheets P placed on the finisher delivery tray 154.

The finisher delivery tray 154 is connected to a shift mechanism (not shown) which shifts (e.g., in four directions: front, rear, left, and right sides) in units of copies in the sort mode.

An operation panel 380 for inputting various copy conditions and a copy start signal for starting copying operation is arranged at the upper portion on the front side of the apparatus main body 10.

The control system of the digital copying machine will be described next with reference to FIG. 2.

The control system of the digital copying machine is roughly divided into three blocks: a basic section 301 in which the scanner section 4 and printer section 6 are connected through an image processing section 315 to construct the digital copying machine; a page memory section 302 which receives image data from the basic section 301, records it, and transfers the recorded image data to the basic section 301 again to realize memory copy (electronic sort); and an expansion section 303 constructed by a mother board comprising a hard disk (HD) serving as a secondary memory for storing compressed image data in the page memory section 302, a FAX board (G4/G3.FAX control means) 369 for transmitting/receiving compressed image data to/from an external device through a public line, a LAN board (local area network line control means) 371 used to transfer data through a LAN, an expansion section CPU 361 for controlling these means through a system bus 373 and an ISA bus 374, a main memory 361a used by the expansion section CPU 61, and a DMAC 362 for controlling DMA transfer on the ISA bus 374.

The basic section 301 and page memory section 302 are connected through a basic section system interface 316 used to transfer control data and a basic section image interface 317 used to transfer image data. The page memory section 302 and expansion section 303 are connected through an expansion section system interface 376 used to transfer control data and an expansion section image interface 377 used to transfer image data.

The basic section 301 comprises the input means (scanner section) 4, output means (printer section) 6, image processing section 315, and a control means (basic section CPU) 311 for controlling these means.

Figure 3:
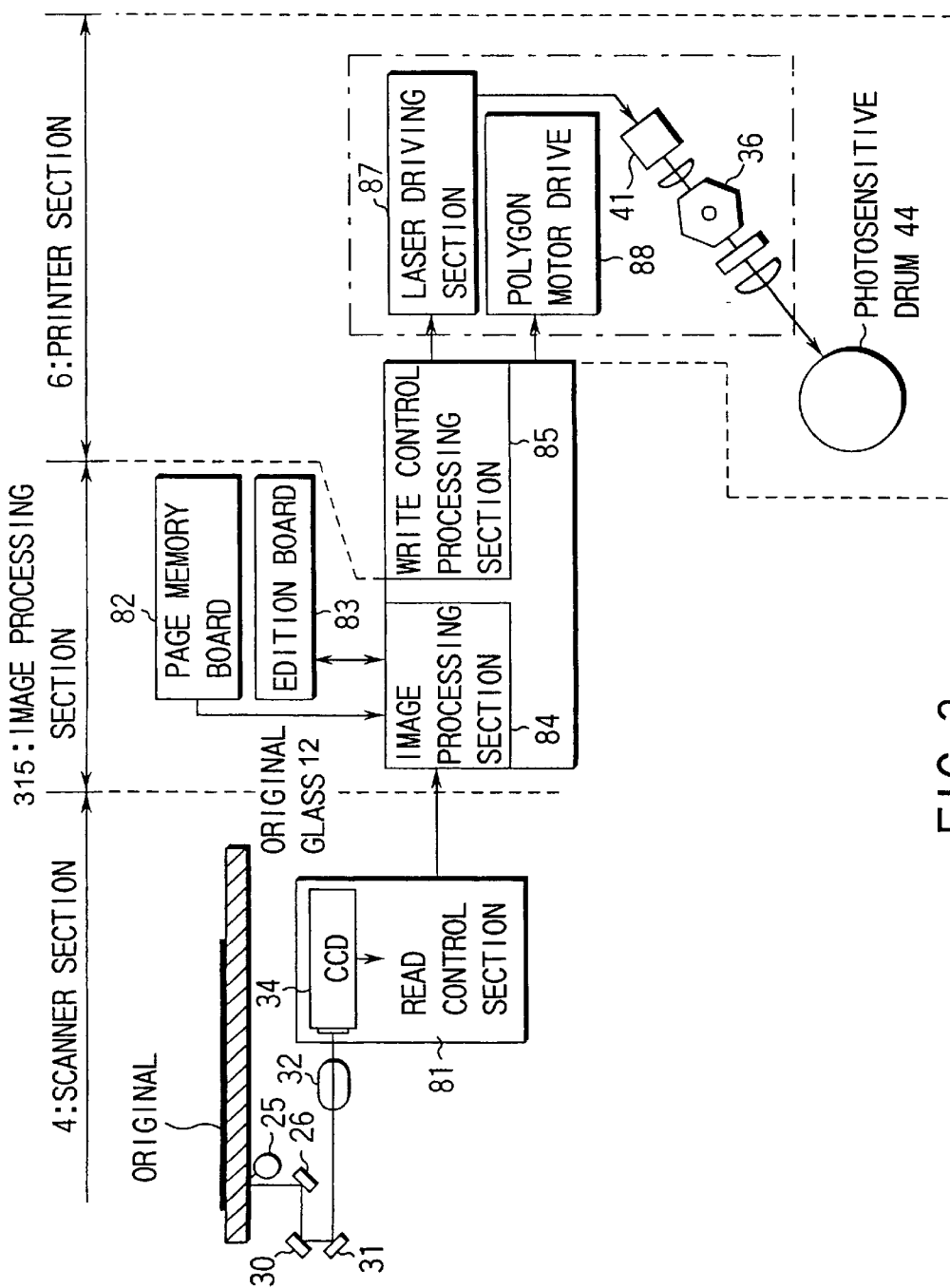
FIG. 3 is a view showing the schematic arrangement of the digital copying machine shown in FIG. 1.

As shown in FIG. 3, the scanner section 4 has a 4-channel output CCD 34 having a plurality of light-receiving elements (1-line CCD) arrayed in lines. The 4-channel output CCD 34 reads the image of an original placed on the original glass table 12 in units of lines in accordance with an instruction from the basic section CPU 311, converts the density of the image into 8-bit digital data, and outputs the data to the image processing section 315 through a scanner interface (not shown) as time-series digital data together with a synchronizing signal.

The basic section CPU 311 controls the means in the basic section 301 and means in the page memory section 302 (to be described later).

The page memory section 302 controls control information communication between the basic section CPU 311 in the basic section 301 and the expansion section CPU 361 in the expansion section 303 or controls access from the basic section 301 or expansion section 303 to a page memory 323. The page memory section 302 comprises a system control means 304, the storage means (page memory) 323 for temporarily storing image data, an address control section 306 for generating an address of the page memory 323, image bus 320 used for data transfer between the respective devices in the page memory section 302, a control bus 321 used to control signal transfer between the respective devices in the page memory section 302 and the system control means 304, a data control means 307 for controlling data transfer in data transfer between the page memory 323 and another device through the image bus 320, an image data I/F means 308 for interfacing image data in image data transfer between the basic section 301 and page memory section 302 through the basic section image interface 317, a resolution conversion/binarization rotation means 325 for, when image data is to be transmitted to a device with a different resolution, converting the image data in accordance with the resolution of this device, converting image data received from a device with a different resolution in accordance with the resolution of the printer section 6 of the basic section 301, or executing 90° rotation processing of binary image data, a compression/expansion means 324 for compressing input image data for a device for compressing image data and is transmitting or storing it as in facsimile transmission or optical disk storage, or expanding compressed image data to make it visible through the printer section 6, and a multilevel rotation memory 309 connected to the image data I/F means 308 to output the image data from the printer section 6 while rotating it through 90° or −90°.

The expansion section 303 comprises the control means (expansion section CPU) 361 for controlling the devices in the expansion section 303 through the expansion section system bus 373, main memory 361a used by the expansion section CPU 361, general-purpose ISA bus 374, an ISA bus controller (ISA.B/C) 363 for interfacing the expansion section system bus 373 and ISA bus 374, the DMA controller (DMAC) 362 for controlling data transfer on the ISA bus 374, a storage means (HDD) 365 connected to the ISA bus 374 to electronically store image data, an HD.FD interface (HD.FDI/F) 364 as the interface of the HDD, a storage means (optical disk device; ODD) 368 connected to the ISA bus 374 to electronically store image data, a SCSI interface 367 as the interface of the storage means 368, the local area network line control means (LAN) 371 used to realize a LAN function, a printer controller means 370 used to realize a printer function, the G4/G3.FAX control means 369 having a FAX control function, and an expansion section image bus 375 used to output image data from the printer controller means 370 to the page memory section 302 through the system image interface 377.

A hard disk HD incorporated in the HDD 365 stores compressed image data as files in units of pages or documents each having a plurality of pages, which are managed by search data for searching for the documents.

The above-described operation panel 380 having a keyboard for inputting instructions to the expansion section 303 and a display is connected to the expansion section system bus 373.

The storage means (ODD) 368 is connected to the ISA bus 374 through the SCSI interface 367. The expansion section CPU 361 controls the storage means 368 through the expansion section system bus 373, ISA.B/C 363, and ISA bus 374 using SCSI commands.

The image data I/F means (image data control means) 308 will be described next. The image data I/F means 308 is a device on the image bus 320 which performs image data transfer between the scanner section 4 or printer section 6 and the page memory 323 through the image processing section 5. The image data I/F means 308 also performs image data transfer between the printer controller 370 connected to the expansion section image bus 375 in the expansion section 303 and the page memory 323.

The page memory 323 of the page memory section 302 has a large memory space.

Figure 2:
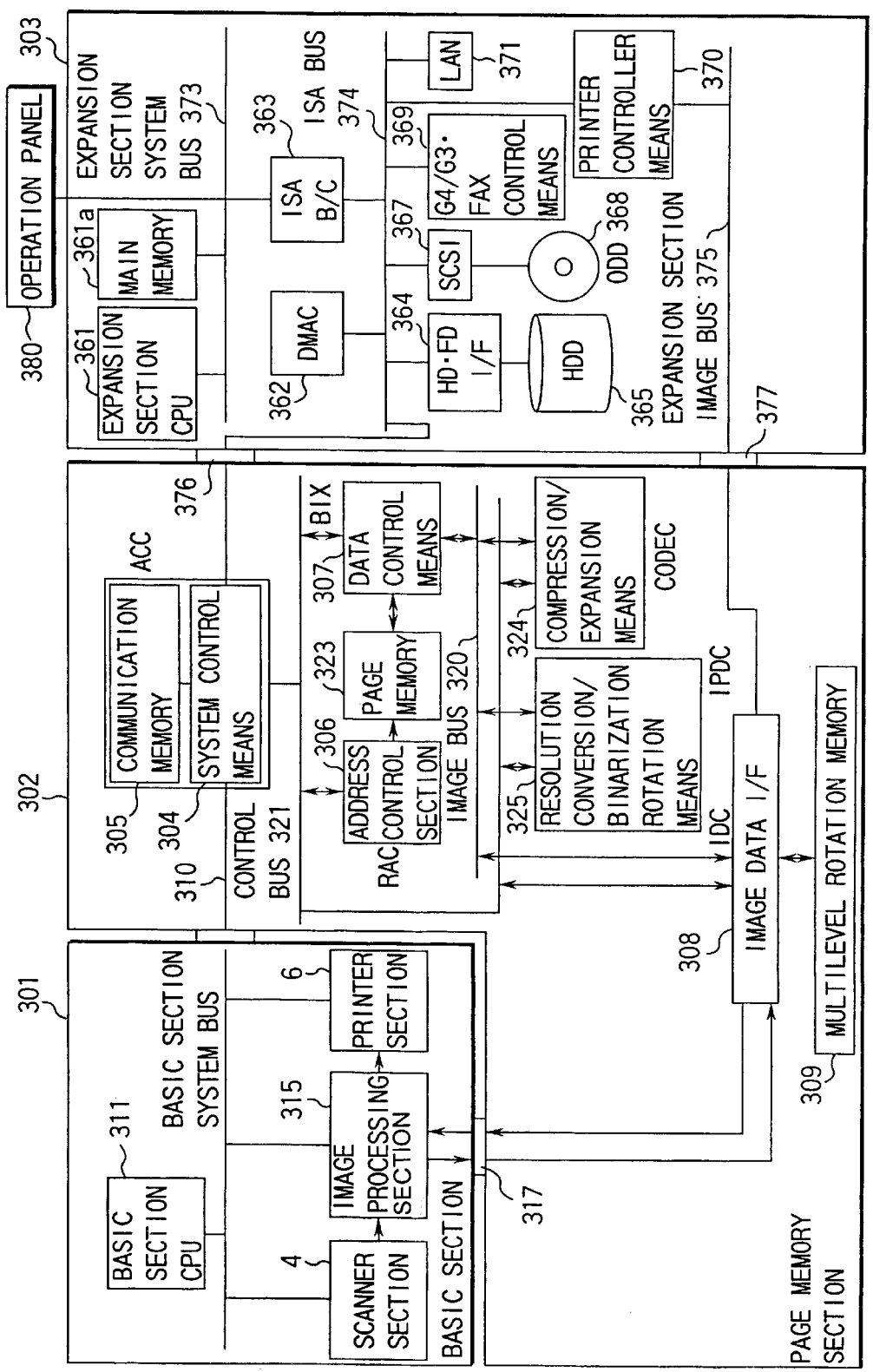
FIG. 2 is a block diagram showing the control system of the digital copying machine.

FIG. 3 shows the schematic arrangement of the digital copying machine shown in FIGS. 1 and 2. As described above, the digital copying machine is constructed by the scanner section 4, image processing section 5, and printer section 6. As shown in FIG. 3, to read an original image by the digital copying machine, the original surface is directly irradiated with light from the exposure lamp 25. The reflected light is guided to the 4-channel output CCD 34 using the mirrors 26, 30, and 31 and imaging lens 32. This optical image data is photoelectrically converted by the 4-channel output CCD 34 and replaced with charge signals in units of a plurality of (7,500 for 600 dpi) light-receiving elements. The charge signals are sequentially transferred by a CCD analog shift register (to be described later) in the 4-channel output CCD 34 and output as analog signals.

As shown in FIG. 3, the control system shown in FIG. 2 comprises a read control section 81 including the 4-channel output CCD 34, a page memory board 82, an edition board 83, an image processing section 84, a write control section 85, a laser driving section 87, and a polygon motor drive 88. A laser beam from the semiconductor laser 41 is deflected by the polygon mirror 36 and guided to the photosensitive drum 44.

Figure 4:
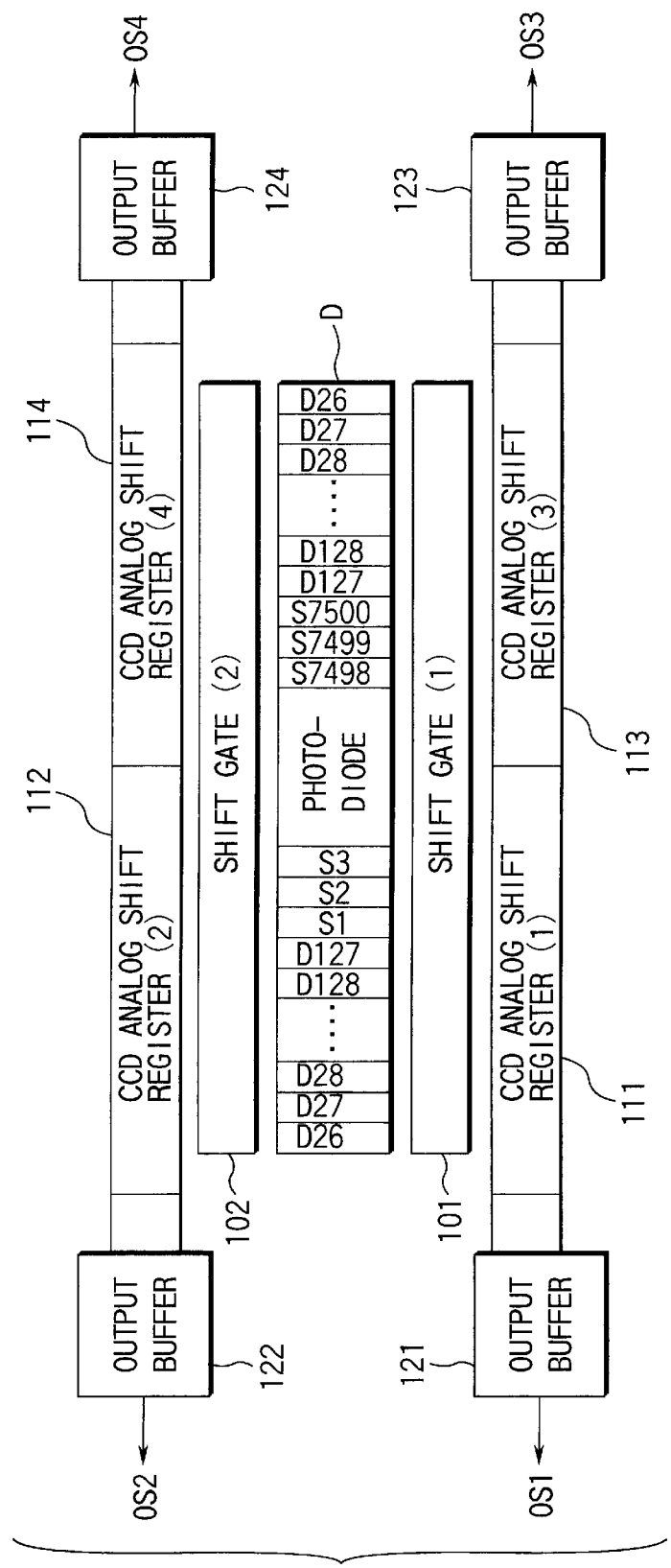
FIG. 4 is a view showing the arrangement of a 4-channel output CCD.

FIG. 4 shows a detailed arrangement of the 4-channel output CCD 34. The 4-channel output CCD 34 is constructed by light-receiving elements (e.g., photodiodes) S1 to S7500 sequentially arrayed (with photodiode expansion slots D26 to D1 27), a shift gate 101, a shift gate 102, CCD analog shift registers 111 to 114, and output buffers 121 to 124.

As shown in FIG. 4, in the 4-channel output CCD 34, the signal output is divided into even and odd components each of which is further divided into left and right channels, thereby forming a 4-channel output system. Hence, four CCD analog shift registers 111, 112, 113, and 114 are present. The CCD analog shift register 111 transfers odd components of the signal sequentially from the light-receiving element at the left end. The CCD analog shift register 112 transfers even components of the signal sequentially from the light-receiving element at the left end. The CCD analog shift register 113 transfers odd components of the signal sequentially from the light-receiving element at the right end. The CCD analog shift register 114 transfers even components of the signal sequentially from the light-receiving element at the right end.

Signals from the light-receiving elements S3749, S3750, S3751, and S3752 adjacent to each other at the center of the light-receiving elements S1 to S7500 are finally output from the left and right channels of the odd and even components. Control signals (transfer clock, shift gate signal, reset signal, and clamp signal) necessary for driving the 4-channel output CCD 34 are generated by the CCD driving function of the high-speed scanner control ASIC (to be described later).

Figure 5:
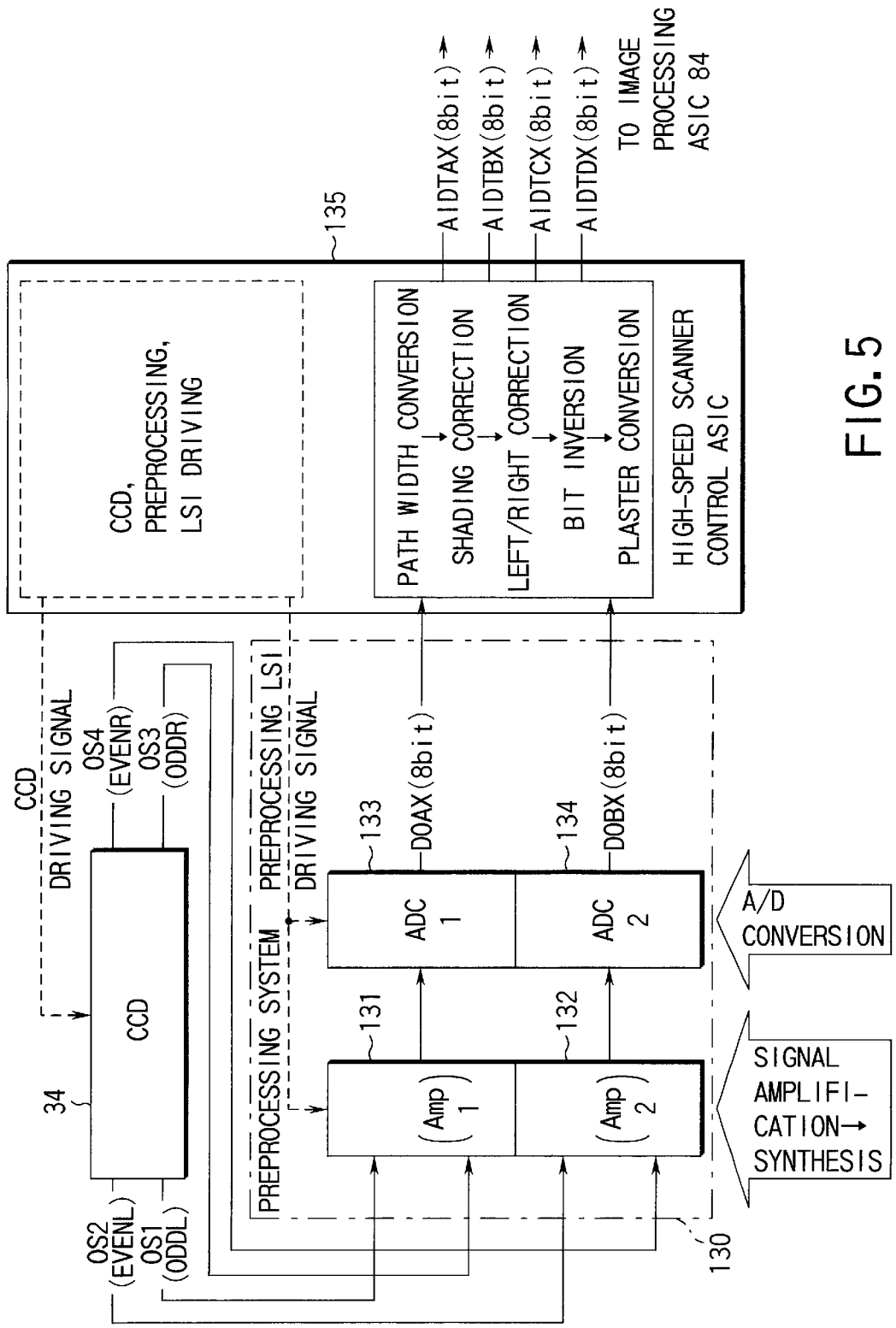
FIG. 5 is a view showing the arrangement of a preprocessing system and high-speed scanner control ASIC.

FIG. 5 shows the arrangement of a preprocessing system 130 and a high-speed scanner control ASIC 135 which transfer image data in the 4-channel output CCD 34 incorporated in the read control section 81 (see FIG. 3). The preprocessing system 130 has amplifiers 131 and 132 and A/D converters 133 and 134.

In the preprocessing system 130, analog signals output from the 4-channel output CCD 34 are sampled and amplified by the amplifiers (Amp: analog signal processing integrated circuits) 131 and 132 in units of pixel signals.

Each of the amplifiers 131 and 132 used can parallelly process two channels by one chip. The left and right channels (output terminals OS1 and OS3) of odd components of pixel signals from the 4-channel output CCD 34 are input to the amplifier 131. The left and right channels (output terminals OS2 and OS4) of even components of pixel signals from the 4-channel output CCD 34 are input to the amplifier 132.

In each of the amplifiers 131 and 132, pixel signals from the left and right channels of the 4-channel output CCD 34 are parallelly processed (sampling and amplification) and synthesized into one channel (multiplexer). The amplifier 131 synthesizes left and right signals of odd components into one channel. The amplifier 132 synthesizes left and right signals of even components into one channel. The signals are output from the amplifiers 131 and 132.

The amplifier 131 processes left and right pixel signals of odd components from the 4-channel output CCD 34 together. The amplifier 132 processes left and right pixel signals of even components from the 4-channel output CCD 34 together. The distortion in left and right signals of each of the even and odd components of the output signal from the 4-channel output CCD 34 can be prevented from depending on a variation between chips (variation in circuit characteristics due to the difference between chips) of the amplifiers (131 and 132).

In this case, the signal output rate from the amplifiers 131 and 132 is twice the signal input rate to the amplifiers 131 and 132. An analog signal corresponding to each pixel, which is amplified to a level appropriate for signal processing and output from the amplifier 131 or 132, is A/D-converted by an A/D converter (ADC 133 or 134) into a digital signal.

The amplifier 131 parallelly samples and amplifies pixel signals of left and right channels of odd components output from the 4-channel output CCD 34 and synthesizes the signals into one channel. The analog signal output from this amplifier 131 is A/D-converted by the A/D converter 133. The amplifier 132 parallelly samples and amplifies pixel signals of left and right channels of even components output from the 4-channel output CCD 34 and synthesizes the signals into one channel. The analog signal output from this amplifier 132 is A/D-converted by the A/D converter 134. Since the resolving power of the A/D converters 133 and 134 used is 8 bits (bit: 256 steps), each pixel data comprises 8 bits.

In this way, pixel signals (analog signals) output from the 4-channel output CCD 34 on the basis of image information (input to the 4-channel output CCD 34 as optical image data) read by the 4-channel output CCD 34 are amplified and synthesized by the amplifiers 131 and 132. The signals are A/D-converted into digital signals by the A/D converters 133 and 134. The series of processing operations are called preprocessing in the scanner section 4 and construct the preprocessing system 130.

Control signals (sample hold pulse, synthesis signal, and clamp signal) necessary for driving the amplifiers 131 and 132 and AD conversion clocks necessary for A/D conversion processing by the A/D converters 133 and 134 are generated by the preprocessing LSI driving function of the high-speed scanner control ASIC 135. Preprocessed pixel signals (8-bit data per pixel; to be referred to as image data hereinafter) based on image information are input to the high-speed scanner control ASIC 135 and subjected to shading correction processing, and left/right correction processing and raster conversion processing, which constitute the present invention, in the high-speed scanner control ASIC 135.

Figure 6:
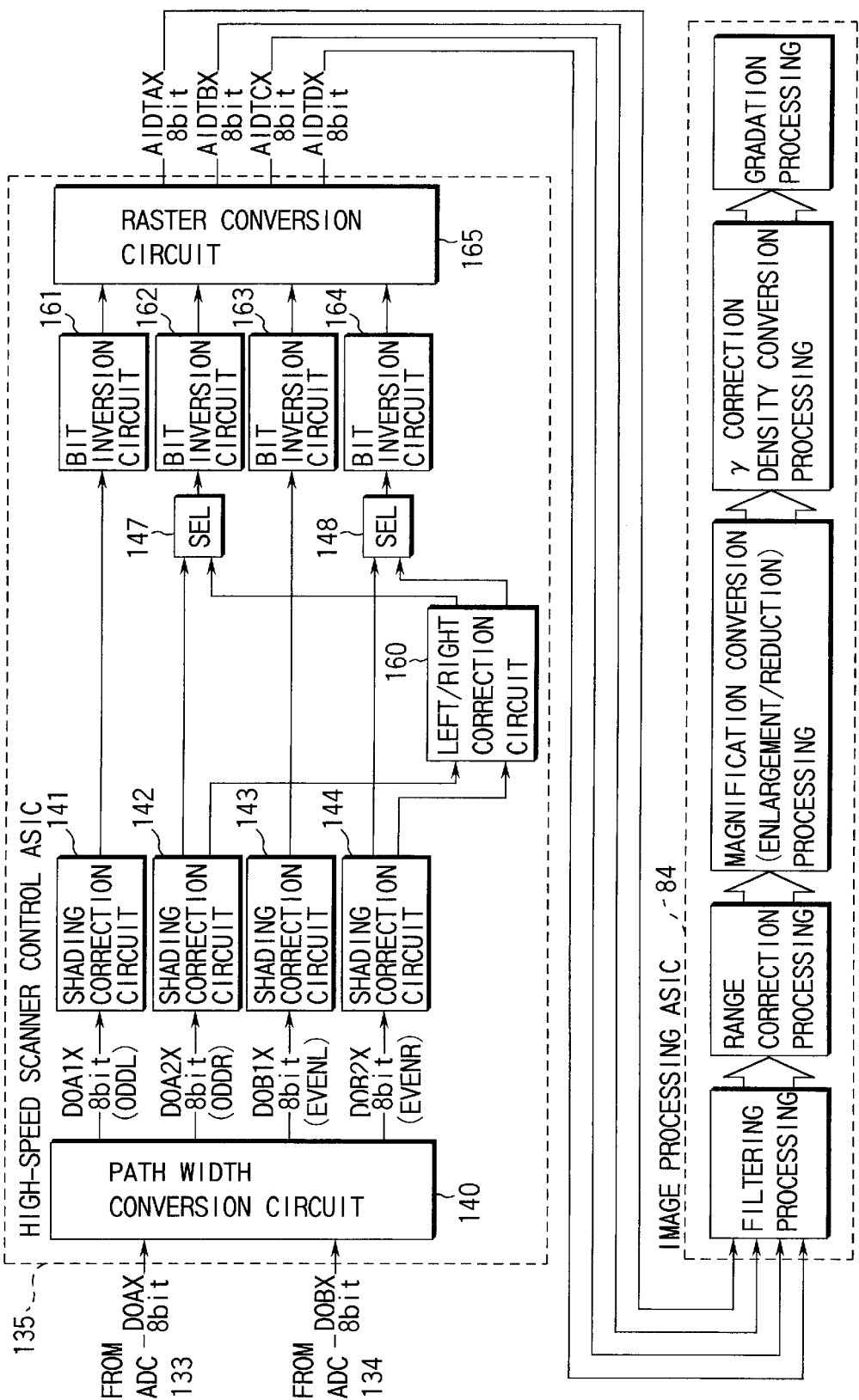
FIG. 6 is a block diagram showing the arrangement of the high-speed scanner control ASIC.

FIG. 6 shows the arrangement of the high-speed scanner control ASIC 135 according to the present invention. The high-speed scanner control ASIC 135 comprises a path width conversion circuit 140, shading correction circuits 141, 142, 143, and 144, bus selection circuits (SEL) 147 and 148, a left/right correction circuit 160, bit inversion circuits 161, 162, 163, and 164, and a raster conversion circuit 165.

Image data preprocessed by the preprocessing system 130 are input to the high-speed scanner control ASIC 135 through two channels as D0AX (8 bits: data obtained by synthesizing left and right channels of odd components) and D0BX (8 bits: data obtained by synthesizing left and right channels of even components).

All processing operations in the high-speed scanner control ASIC 135 are performed for image data converted into digital data in the preprocessing system 130. Each of the odd and even components is divided into left data and right data through the path width conversion circuit 140. More specifically, D0AX (8 bits) as data obtained by synthesizing left and right channels of odd components is decomposed into D0A1X (8 bits: left data of odd components) and D0A2X (8 bits: right data of odd components) by the path width conversion circuit 140. D0BX (8 bits) as data obtained by synthesizing left and right channels of even components is decomposed into D0BLX (8 bits: left data of even components) and D0B2X (8 bits: right data of even components) by the path width conversion-circuit 140.

The image data input through two channels is decomposed into four channels by the path width conversion circuit 140. For example, when the image data D0AX and D0BX are input through two channels at a data rate of 40 MHz per channel, the image data are converted into D0A1X, D0A2X, D0BLX, and D0B2X by path width conversion processing, output through four channels at a data rate of 20 MHz per channel, and input to the next stage.

The image data D0A1X (8 bits: left data of odd components), D0A2X (8 bits: right data of odd components), D0BLX (8 bits: left data of even components), and D0B2X (8 bits: right data of even components), which are decomposed by path width L conversion processing, are shading-corrected by the shading correction circuits 141, 142, 143, and 144, respectively. As shown in FIG. 6, the high-speed scanner control ASIC 135 prepares four shading correction circuits so as to simultaneously process the image data D0A1X, D0A2X, D0B1X, and D0B2X of four channels in parallel.

The shading correction function will be briefly described. Shading correction has white level shading correction and black level shading correction. The high-speed scanner control ASIC 135 has a circuit arrangement based on an algorithm compatible with both correction functions.

In white level shading correction, read data (image data) on an original read by the 4-channel output CCD 34 is divided by white reference data, which has been read by the 4-channel output CCD 34 in advance, in units of pixels, thereby normalizing (correcting) the read data (image data)

on the original in units of pixels. With this processing, a variation in illuminance and a variation in sensitivity between light-receiving elements of the 4-channel output CCD 34 can be corrected.

In black level shading correction, to eliminate the influence of a dark current generated in each light-receiving element in the 4-channel output CCD 34, which is a main factor of distortion in black level, is canceled (corrected) by subtracting black reference data, which has been read by the 4-channel output CCD 34 in advance, from the read data (image data) on the original and white reference data which are read by the 4-channel output CCD 34, in units of pixels.

The left and right data of even and odd components of the shading-corrected pixel data are corrected by the left/right correction circuit 160 as the present invention and bit-inverted by the bit inversion circuits 161, 162, 163, and 164. The raster conversion circuit 165 that constitutes the present invention rearranges the image data.

The image data which have undergone the series of processing operations in the high-speed scanner control ASIC 135 are output from the high-speed scanner control ASIC 135 as AIDTAX (8 bits), AIDTBX (8 bits), AIDTCX (8 bits), and AIDTDX (8 bits) and transferred to the image processing ASIC 84. The image data input to the image processing ASIC 84 are subjected to a series of data processing operations as image processing including filtering processing, range correction processing, magnification conversion (enlargement/reduction) processing, γ correction density conversion processing, and gradation processing in the image processing ASIC 84.

Figure 7:
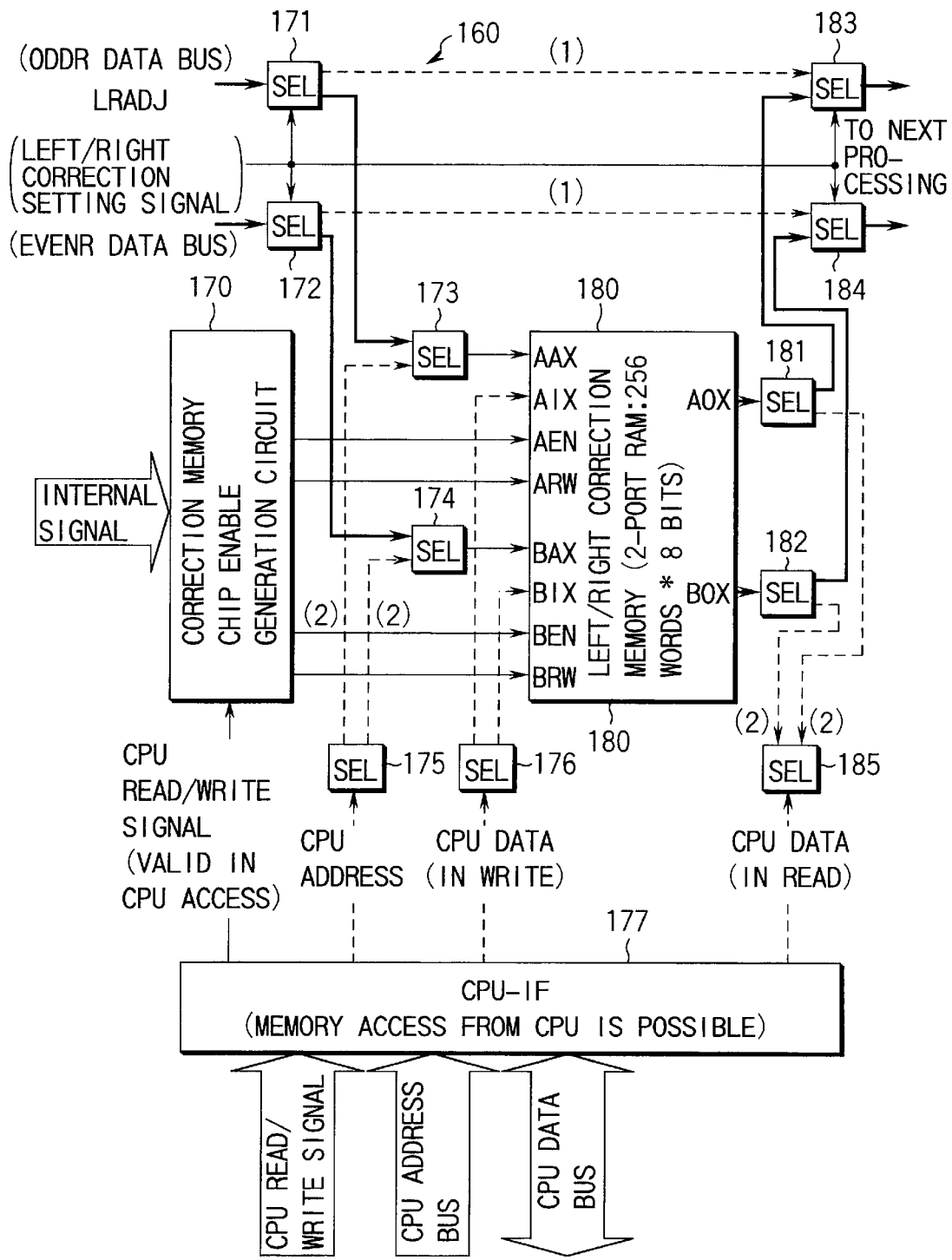
FIG. 7 is a view showing the arrangement of a left/right correction circuit.

FIG. 7 shows the arrangement of the left/right correction circuit 160. The left/right correction circuit 160 comprises a correction memory chip enable generation circuit 170, bus selection circuits (SEL) 171, 172, 173, 174, 175, and 176, a memory 180 used for left/right correction, and bus selection circuits (SEL) 181, 182, 183, 184, and 185. This left/right correction circuit 160 is controlled through a CPU-IF circuit 177.

As described above, to meet the required specification for high-speed processing, the high-speed line sensor (4-channel output CCD 34) used as a read scanner in a high-speed digital copying machine divides charge signals photoelectrically converted by the light-receiving elements S1 to S7500, i.e., pixel signals of one line of the 4-channel output CCD 34 (for, e.g., 600 dpi, pixel signals from 7,500 pixels) into four systems using four CCD analog shift registers: the CCD analog shift register 111 (for transferring charge signals of left odd components), CCD analog shift register 112 (for transferring charge signals of left even components), CCD analog shift register 113 (for transferring charge signals of right odd components), and CCD analog shift register 114 (for transferring signals of right even components), and four output buffers arranged on the left and right sides of the CCD analog shift registers: the output buffer 121 (for driving signal outputs of left odd components), output buffer 122 (for driving signal outputs of left even components), output buffer 123 (for driving signal outputs of right odd components), and output buffer 124 (for driving signal outputs of right even components), and outputs the charge signals, as shown in FIG. 4.

In this arrangement, pixel signals from the light-receiving elements S3749, S3750, S3751, and S3752 adjacent to each other at the center of the 4-channel output CCD 34 are finally output from the left and right channels of the odd and even components. Hence, in the 4-channel output CCD 34, even and odd components of pixel signals of one line of the 4-channel output CCD 34 are driven by different output buffers (121 and 123, and 122 and 124) for each of the left and right channels and output, the signal transmission path is obviously divided into four systems first at the output stage of the 4-channel output CCD 34.

The pixel signals (analog signals) output from the 4-channel output CCD 34 are amplified and A/D-converted into digital image data by the above-described preprocessing system 130. At this time as well, the number of systems of the signal transmission path arbitrarily changes from one to four depending on the arrangement of the preprocessing system 130.

Image information input to the 4-channel output CCD 34 as an optical image signal is photoelectrically converted into charge signals in units of the plurality of light-receiving elements (S1 to S7500) in the 4-channel output CCD 34. Assume that an optical image signal having the same density corresponding to the reflectance of the original is photoelectrically converted by the light-receiving elements (S1 to S7500) as image information on the original to be read to obtain charge signals. If the charge signals are transmitted through different transmission paths (processing paths), distortion may be generated between pixel signals (image data) due to the deviation based on the circuit characteristics of the 4-channel output CCD 34 and preprocessing system 130.

Actually, as for the adverse affect of the deviation due to the circuit characteristics, the following facts have been confirmed by simulations. When the image data is printed as a copy by processing even and odd components of an output signal from the CCD through one signal transmission path (processing path), as in the preprocessing system using the conventional 2-channel output CCD, the adverse affect does not appear on the printed image as an average density difference. However, when processing is performed through signal transmission paths (processing paths) for dividing each of the even and odd components into left and right components, as in the preprocessing system 130 using the 4-channel output CCD 34, as shown in FIG. 5, for the high-speed digital copying machine, the adverse affect appears on the left and right sides of the printed image as an average density difference of a visually noticeable level.

The difference in signal transmission path (processing path) between the odd components and even components does not pose a serious problem. However, when the 4-channel output CCD 34 coping with high-speed processing is used, left and right components preferably pass through one signal transmission path (processing path). If this can be realized as the arrangement of the 4-channel output CCD 34 and preprocessing system 130, no special countermeasures need be taken against the adverse affect of deviation due to the circuit characteristics.

The arrangement of the preprocessing system 130 shown in FIG. 5 is a physically possible system arrangement. However, the 4-channel output CCD 34 divides charge signals photoelectrically converted by the light-receiving elements S1 to S7500, i.e., pixel signals of one line of the CCD 34 into four systems using the four CCD analog shift registers 111, 112, 113, and 114 and four output buffers 121, 122, 123, and 124 arranged on the left and right sides of the CCD analog shift registers and outputs the charge signals because of its structure. For this reason, the deviation is generated due to the transmission efficiencies of the CCD analog shift registers (111, 112, 113, and 114) and the characteristics of the output buffers (121, 122, 123, and 124).

As shown in FIG. 5, of the output signals from the 4-channel output CCD 34, left and right signals of odd components are processed together by the amplifier 131, and left and right signals of even components are processed together by the amplifier 132. With this arrangement, the deviation in circuit characteristics of the amplifiers due to the chip difference between the amplifier 131 and amplifier 132 can be prevented from affecting the left and right signals.

However, when it is assumed that each amplifier has a one-chip structure, in each of the amplifiers (131 and 132), input signals of two channels are parallelly processed by sampling processing and signal amplification processing, i.e., two systems of circuits are present because of the internal circuit arrangement of the amplifiers (131 and 132). That is, each of the amplifiers (131 and 132) has different signal transmission paths for the left and right signals. Hence, a characteristic deviation is generated between the two systems of circuits in the chip.

In the A/D converters 133 and 134, the left and right signals of odd or even components are processed through one conversion path. More specifically, the left and right signals of odd components (synthesized into one channel by the amplifier 131) are A/D-converted by the A/D converter 133. The left and right signals of even components (synthesized into one channel by the amplifier 132) are A/D-converted by the A/D converter 134. This suggests that there is no influence of deviation due to the circuit characteristics on the left and right signals.

Hence, in the system arrangement of the 4-channel output CCD 34 and preprocessing system 130 for the high-speed digital copying machine shown in FIG. 5, the influence of a variation between chips can be prevented by a certain combination.

However, as described about the 4-channel output CCD 34 and amplifiers 131 and 132, in fact, the adverse affect of deviation based on the circuit characteristics due to the internal structure of the chip itself on the left and right image data (image density difference between left and right data, which is generated by linear deviation in image data) cannot be alleviated unless some external correction means is provided. As this means, the left/right correction circuit 160 that constitutes the present invention is used as one circuit in the high-speed scanner control ASIC 135.

The left/right correction circuit 160 is located, in the high-speed scanner control ASIC 135, after the shading correction circuits 141, 142, 143, and 144, and in the flow of image data processing, before the series of data processing operations by the image processing ASIC 84, including filtering processing, range correction processing, magnification conversion (enlargement/reduction) processing, γ correction density conversion processing, and gradation processing, as shown in FIG. 7.

The meaning of this location will be described later. First, the arrangement of the left/right correction circuit 160 will be described.

Left/right correction by the left/right correction circuit 160 is performed on the basis of a data conversion table scheme using the memory 180. More specifically, data (in this case, image data) to be converted is input to an address of the memory 180. Instead of converted data, data (corrected data) which has been set in correspondence with each address of the memory 180 in advance is output from the data output of, the memory 180, thereby realizing conversion processing.

Image data to be processed in the high-speed scanner control ASIC 135 is a digital signal comprising 8 bits per pixel and having a resolution of 256 steps (00H to FFH). Hence, as the memory 180 for the data conversion table for processing such image data, a memory having a capacity of 256 words (WORD)*8 bits is prepared.

The left/right correction circuit 160 comprises the memory 180 as a 2-port RAM with a capacity of 256 words*8 bits, chip enable generation circuit 170, and bus selection circuits 171, 172, 173, 174, 175, 176, 181, 182, 183, 184, and 185. The left/right correction circuit 160 is controlled through the CPU-IF circuit 177. This memory 180 is switched between an access mode (data correction processing) for data processing in the high-speed scanner control ASIC 135 and an access mode (data setting for the conversion table) from the basic section CPU (external) 311 by a mode setting signal (memory access mode setting signal: set by DAM).

Since left/right correction execution selection (left/right correction setting signal: set by LRADJ) can also be set, image data can be sent to processing at the next stage without any left/right correction (the image data paths in this case are indicated by broken lines ①). To set various modes, mode setting registers are prepared in the high-speed scanner control ASIC 135. Setting for all of these registers can be changed from the basic section CPU (external) 311.

When the memory 180 is set in the access mode for data processing in the high-speed scanner control ASIC 135 (state wherein data correction processing is enabled), and a left/right correction signal indicates correction, the image data bus in the high-speed scanner control ASIC 135 is connected to the memory 180.

More specifically, image data digitized by the preprocessing system 130 and input to the high-speed scanner control ASIC 135 through two channels are decomposed into four channels (left data of odd components, right data of odd components, left data of even components, and right data of even components) first by the bus width conversion circuit 140. These image data of four channels are parallelly shading-corrected by the shading correction circuits 141, 142, 143, and 144, respectively.

Of the shading-corrected image data of four channels, two channels: for example, one of the left and right channels of odd components, e.g., the right data bus, and one of the left and right channels of even components, e.g., the right data bus, are connected to the correction memory 180 through the bus selection circuits 171 to 175 and 181 to 184. More specifically, the bus lines indicated by broken lines ① are disabled. As indicated by bold solid lines, one of the left and right channels of odd components, e.g., right data (image data before left/right correction) is connected to an address input AAX of a port A of the memory 180. Converted data (left/right-corrected image data) corresponding to the input data is output from a data output A0X of the port A. One of the left and right channels of even components, e.g., right data (image data before left/right correction) is connected to an address input BAX of a port B of the correction memory. Converted data (left/right-corrected image data) corresponding to the input data is output from a data output B0X of the port B.

That is, the left or right channels of odd and even components, e.g., right data can be operated using the data conversion table of the memory 180. As is apparent, to operate data using the data conversion table of the memory 180, a memory having input and output terminals of two channels is required to process the left or right channels of odd and even components in the image data of four channels. In addition, to parallelly process (memory access) the image data of two channels by the same data conversion table, a 2-port memory which satisfies these conditions is used.

The concept of left and right data correction by this scheme is as follows. The left or right channels of odd and even components, e.g., right data are used as a reference. The remaining channels, e.g., right data when the left data are used as a reference are operated using the data conversion table of the correction memory. That is, one of the left and right channels is operated and matched with the other data, thereby alleviating (correcting) the linear deviation in image density between the left and right image data.

The meaning of the position of this left/right correction will be described next.

Image data before digital conversion by the preprocessing system 130 and internal processing by the high-speed scanner control ASIC 135 contains, in units of pixels, the influence of deviation in density gradient of each pixel of the image data in association with the image density, i.e., a variation in illuminance, a variation in sensitivity between the light-receiving elements of the 4-channel output CCD 34, and a dark current generated in each of the light-receiving elements S1 to S7500 of the 4-channel output CCD 34 and the CCD analog shift registers 111 to 114. The image data also contains the influence of deviation unique to the 4-channel output CCD 34 coping with high-speed processing and the preprocessing system 130 because of their arrangements, i.e., linear deviation in image density, which is generated between left and right image data, or deviation in circuit characteristics, which is generated because of the difference in signal transmission path (processing path) between the left and right signals in the 4-channel output CCD 34 and preprocessing system 130.

The two deviations act on image data in different manners. More specifically, the deviation in density gradient of each pixel of image data, which is generated in association with the image density, acts in units of pixels of the image data. On the other hand, the linear deviation in image density between left and right image data (between signal transmission paths (between processing paths)) acts in units of signal transmission paths (processing paths).

More specifically, assume that there are two signal transmission paths (processing paths) A and B (left and right in this case), and a deviation in circuit characteristics is generated between these signal transmission paths (processing paths). When the signal transmission path (processing path) A is considered as a reference, the deviation in circuit characteristics acts on the other signal transmission path (processing path) B. At this time, this deviation uniformly acts on all pixel signals transmitted (processed) through the signal transmission path (processing path) B in a predetermined amount.

Hence, it is suggested that the influence of the two deviations with different characteristics (the influence of deviation in density gradient of each pixel of the image data), which is generated in association with the image density and the influence of linear deviation in image density between left and right image data (between signal transmission paths (between processing path)) contained in the image data digitized by the preprocessing system 130 must be corrected independent correction means.

More specifically, the influence of deviation in density gradient of each pixel of the image data, which is generated in association with the image density, is corrected by the shading correction function, and the influence of linear deviation in image density between left and right image data (between signal transmission paths (between processing paths)) is corrected by the left/right correction circuit 160 that constitutes the present invention.

On the basis of this concept, as the arrangement of processing (flow of processing) for image data in the high-speed scanner control ASIC 135, first, the shading correction circuits 141 to 144 are used to shading-correct image data, and then, the left/right correction circuit 160 is used to perform left/right correction of the shading-corrected image data, as shown in FIG. 6. The two correction processing operations are performed before the series of data processing operations by image processing by the image processing ASIC 84, including filtering processing, range correction processing, magnification conversion (enlargement/reduction) processing, γ correction density conversion processing, and gradation processing are performed.

This processing arrangement has another significance. With this processing arrangement, the scheme of the left/right correction circuit 160 that constitutes the present invention effectively functions as a correction function.

With such processing arrangement, image data before digital conversion by the preprocessing system 130 and internal processing by the high-speed scanner control ASIC 135, which contains the influence of deviation in density gradient of each pixel of the image data in association with the image density and the influence of linear deviation in image density, which is generated between left and right image data (between signal transmission paths (between processing paths)) is processed first by shading correction processing to correct the influence of deviation in density gradient of each pixel of the image data, which is generated in association with the image density.

That is, when the image data is shading-corrected, the factor of deviation that acts in units of pixels, i.e., a variation between pixels is corrected. More specifically, with the shading correction, image signals from the 4-channel output CCD 34, which are formed from pixel signals having a variation between pixels, are normalized (standardized) for all pixels. That is, all pixel signals (in this case, pixel signals as digital signals with 8 bits per pixel) digitized by A/D conversion by the A/D converters 133 and 134 in the preprocessing system 130 are linearly expressed on a standard table on which reflectances of light (0%→100%: black→white) on the original are plotted along the abscissa, and signal values (in this case, a pixel signal is an 8-bit digital signal, and 00H→FFH: black→white) are plotted along the ordinate.

The scheme of the left/right correction circuit 160 that constitutes the present invention is a data conversion table scheme using the memory 180, i.e., a scheme of replacing the signal value (00H→FFH because the image signal is an 8-bit digital signal) of input image data with a value (correction value) set in the memory 180 in advance and outputting the value. That is, one data conversion table is used in which a signal value itself is replaced with a certain value within the range of 00H to FFH because the signal to be processed is an 8-bit digital signal.

Hence, this scheme aims at correcting the influence of linear deviation in image density between left and right image data (between signal transmission paths (between processing paths)), which acts in units of signal transmission paths (processing paths) and uniformly acts in a predetermined amount on all pixel signals forming the image data to be transmitted (processed) through a signal transmission path (processing path) where correction processing is performed, and does not aim at correcting data containing a variation between pixels in units of pixels. When correction processing is to be performed by using this scheme, a variation between pixels of image data, i.e., the influence of deviation in density gradient of each pixel of the image data, which is generated in association with the image density, must be canceled in advance by shading correction.

The shading-corrected image data is consequently normalized (standardized) for all pixel signals, as described above. For this reason, the left/right correction scheme that constitutes the present invention, i.e., one data conversion table in which a signal value itself is replaced with a certain value within the range of 00H to FFH because the signal to be processed is an 8-bit digital signal can be commonly used for the signal values of all pixel signals of image data to be transmitted (processed) through a signal transmission path (processing path) requiring correction.

This is still another importance of the left/right correction circuit 160 that constitutes the present invention. That is, image data whose influence of a variation between pixels, i.e., deviation in density gradient of each pixel of the image data, which is generated in association with the image density has been corrected (i.e., normalized (standardized)) by shading correction can be corrected by commonly applying the left/right correction scheme that constitutes the present invention, i.e., one data conversion table in which a signal value itself is replaced with a certain value (within the range of 00H to FFH because the signal to be processed is an 8-bit digital signal) to the signal values of all pixel signals of image data to be transmitted (processed) through a signal transmission path (processing path) requiring correction.

These processing operations aim at correcting the influence of two deviations generated by the 4-channel output CCD 34 and preprocessing system 130 and therefore must be executed before the subsequent series of data processing operations by image processing by the image processing ASIC 84, including filtering processing, range correction processing, magnification conversion (enlargement/reduction) processing, γ correction density conversion processing, and gradation processing.

The method of setting conversion table data (correction data) in the memory 180 of the left/right correction circuit 160 that constitutes the present invention will be described next.

As described above, the memory 180 can be switched between the access mode (data correction processing) for data processing in the high-speed scanner control ASIC 135 and the access mode (data setting for the conversion table) from the basic section CPU (external) 311 by the mode setting signal (memory access mode setting signal: set by DAM).

When the memory 180 is set in the access mode from the basic section CPU (external) 311 (data for the conversion table can be set by the basic section CPU 311), address and data buses from the basic section CPU (external) 311 are connected to the memory 180 through the CPU-IF circuit 177 in the high-speed scanner control ASIC 135, as shown in FIG. 7. That is, lines indicated by broken lines ②are enabled. At this time, the basic section CPU (external) 311 sets (writes), in the memory 180, correction data for the conversion i table, which is generated on the basis of the deviation generated between left and right image data.

Since the basic section CPU 311 can also read/write-access the memory 180, the basic section CPU 311 can refer to data in the memory 180.

The raster conversion circuit 165 will be described next.

The raster conversion circuit 165 also has a unique function that is necessary when the line sensor, i.e., 4-channel output CCD 34 capable of high-speed processing is used as the read scanner of the high-speed digital copying machine. The raster conversion circuit 165 aims at arranging image data in order by aligning them, i.e., rearrangement.

First, the reason why image data must be rearranged in use of the 4-channel output CCD 34 will be described with reference to FIGS. 8 and 9.

Figure 8:
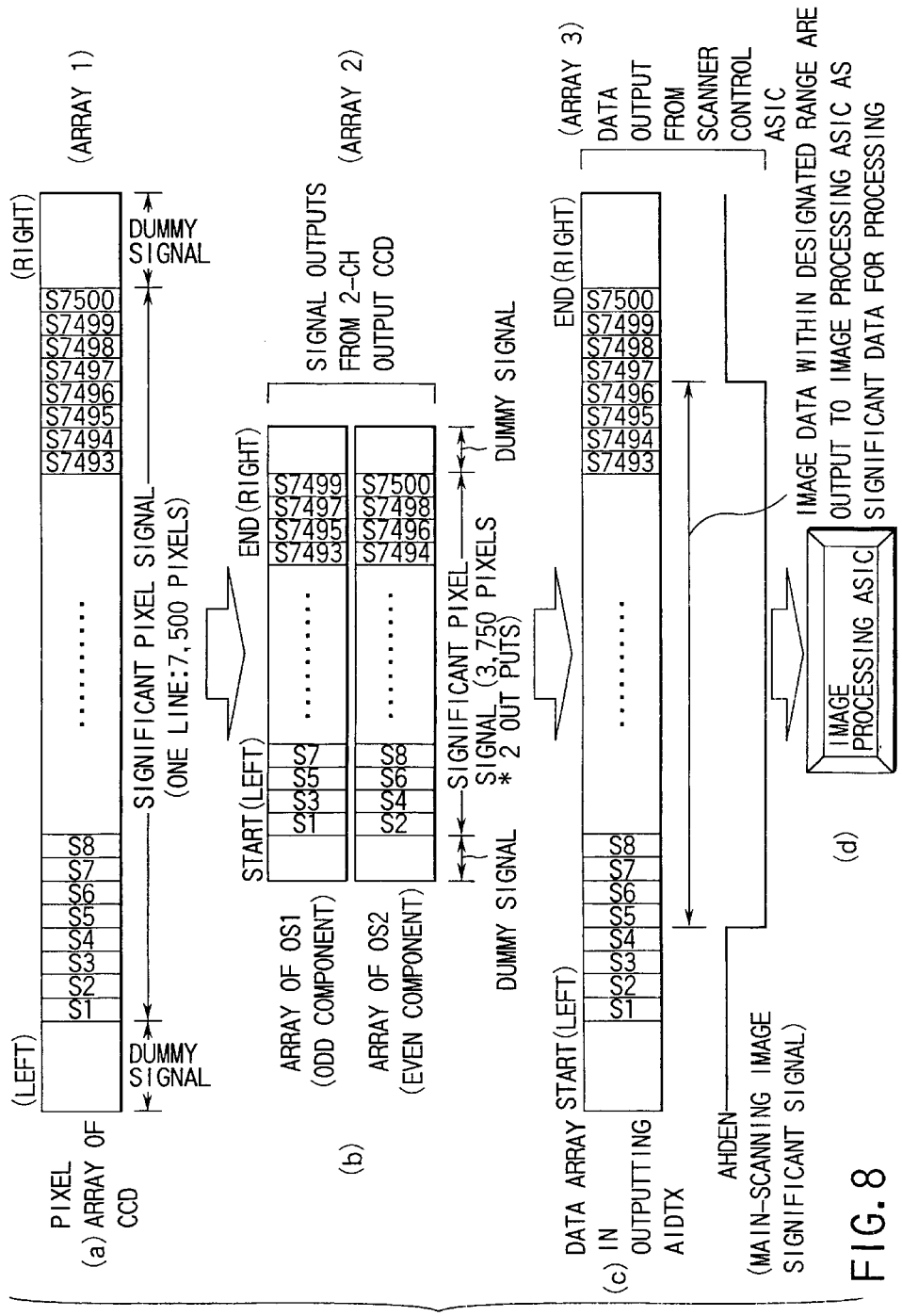
FIG. 8 is a view showing the flow of data array in use of a conventional 2-channel output CCD.

FIG. 8 shows the flow of data arraying in use of a conventional 2-channel output CCD. FIG. 9 shows the flow of data arraying in use of the 4-channel output CCD 34 of the present invention. The pixel arrays, i.e., arrays 1 of the 2-channel output CCD and 4-channel output CCD have dummy pixels and significant pixels, as shown in FIGS. 8 and 9.

Image information of an original to be read is output from the CCD as significant pixel signals of the significant pixels. A CCD compatible with a resolution of 600 dpi has 7,500 pixels (S1 to S7500) as significant pixels. As indicated by array 1, the significant pixels are sequentially arrayed from S1 on the left side to S7500 on the right side in order. Both the conventional 2-channel output CCD and 4-channel output CCD 34 of the present invention have the same significant pixel array. This corresponds to the physical array of light-receiving elements (S1 to S7500).

As described with reference to FIG. 3, to read an original image by the high-speed digital copying machine, the original surface is directly irradiated with light, and the reflected light is guided to the 4-channel output CCD 34 using the mirrors 26, 30, and 31 and imaging lens 32. This optical image data, i.e., image information is photoelectrically converted by the 4-channel output CCD 34 and replaced with charge signals in units of light-receiving elements, i.e., significant pixels. These signals are output from the 4-channel output CCD 34 as significant pixel signals. As the structure of the read optical system, the left and right sides of an original correspond to the left and right sides of the 4-channel output CCD 34. That is, the direction in which an original is read by the CCD, i.e., the left and right sides of an original in the main scanning direction correspond to the left and right sides of the significant pixel array of the 4-channel output CCD 34 indicated by array 1.

The basic concept of the algorithm of the series of data processing operations by image processing by the image processing ASIC 84, including filtering processing, range correction processing, magnification conversion (enlargement/reduction) processing, γ correction density conversion processing, and gradation processing assumes that the array of image data to be input to the image processing ASIC 84 (data array of pixels of one line in the main scanning direction), i.e., the image data array as image information of one line in the main scanning direction is the same as the pixel array of the 4-channel output CCD 34, i.e., array 1, or similar to array 1 in the aligned state.

That is, the algorithm of data operations of the series of data processing operations by the image processing ASIC 84 is realized for image data input with the same array as array 1 or a similar data array in the aligned state.

In the conventional system, i.e., the system using the 2-channel output CCD, the pixel array of the CCD, i.e., array 1 equals the array of image data output from the scanner control ASIC to the image processing ASIC, i.e., array 3, as shown in FIG. 8.

More specifically, in the conventional system using the 2-channel output CCD, first, signals output from the CCD, which have the pixel array of the CCD, i.e., array 1, are divided into two channels corresponding to even and odd components. As indicated by array 2, significant pixel signals of odd pixels are sequentially output from the output terminal OS1 starting from the significant pixel S1 on the left side in the order of S3, S5, . . . , S7495, S7497, and S7499 (the rightmost significant pixel in the end direction). Significant pixel signals of even pixels are sequentially output from the output terminal OS2 starting from the significant pixel S2 on the left side in the order of S4, S6, . . . , S7496, S7498, and S7500 (the rightmost significant pixel in the end direction). The pixel signals are input to the scanner control ASIC through two channels while maintaining these arrays.

The input image data of two channels are synthesized (multiplexed) into one channel in the scanner control ASIC. More specifically, the image data has array 3. In this state, the image data having a data array as indicated by array 3 are processed in the scanner control ASIC, i.e., shading-corrected and bit-inverted, and then, transferred to the image processing ASIC as AIDTX. In this arrangement, processing for alignment, i.e., rearranging by data operation is not particularly required between array 1 and array 3.

However, in the system capable of high-speed processing and using the 4-channel output CCD 34 of the present invention, signals output from the 4-channel output CCD 34, which have the pixel array of the 4-channel output CCD 34, i.e., array 1, are divided into two channels corresponding to even and odd components, as in the 2-channel output CCD. These signals are further divided into left and right components at the center of the 4-channel output CCD 34. AS indicated by array 2, significant pixel signals of odd pixels are sequentially output from the output terminal OS1 starting from the significant pixel S1 on the left side in the order of S3, S5, . . . , S3745, S3747, and S3749 (the central significant pixel in the end direction).

Similarly, significant pixel signals of even pixels are sequentially output from the output terminal OS2 starting from the significant pixel S2 on the left side in the order of S4, S6, . . . , S3746, S3748, and S3750 (the central significant pixel in the end direction).

Similarly, significant pixel signals of odd pixels are sequentially output from the output terminal OS3 starting from the significant pixel S7499 on the right side in the order of S7497, S7495, . . . , S3755, S3753, and S3751 (the central significant pixel in the end direction).

Similarly, significant pixel signals of even pixels are sequentially output from the output terminal OS4 starting from the significant pixel S7500 on the right side in the order of S7498, S7496, . . . , S3756, S3754, and S3752 (the central significant pixel in the end direction).

The signals of four channels are synthesized in the amplifiers 131 and 132 in the preprocessing system 130. More specifically, the left and right signals of odd components, i.e., the output terminal OS1 and output terminal OS3 are synthesized into one channel, and the left and right signals of even components, i.e., the output terminal OS2 and output terminal OS4 are synthesized into one channel. In this state, even and odd components are input to the high-speed scanner control ASIC 135 through two channels.

The input preprocessing system of two channels are decomposed into four channels that have an image data array equal to array 2 again by processing by the bus width conversion circuit 140 in the high-speed scanner control ASIC 135, as shown in FIG. 6.

In this state, the four channels are processed in the high-speed scanner control ASIC 135. More specifically, the image data of four channels having a data array indicated by array 2 are parallelly shading-corrected by the shading correction circuits 141 to 144, left/right-corrected by the left/right correction circuit 160, and bit-inverted by the bit inversion circuits 161 to 164. The image data of four channels are aligned in order, i.e., rearranged by arraying the image data by the raster conversion circuit 165 and set in the state indicated by array 3. That is, array 2 is converted into array 3. With this processing, the preprocessing system of four channels AIDTAX, AIDTBX, AIDTCX, and AIDTDX are transferred to the image processing ASIC 84.

The reason why image data to be transferred to the image processing ASIC 84 are divided into four channels, unlike the prior art with one channel will be described first. For a high-speed digital copying machine, the image processing speed is also required to be high. When image data of one line from the 4-channel output CCD 34 is processed through one channel, the data transfer rate, i.e., processing speed per pixel becomes very high, and various margins necessary for hardware processing have shortages.

To solve this problem, image data of one line is decomposed into four channels, and these channels are parallelly processed. More specifically, by parallelly processing four channels, the data transfer rate, i.e., processing speed per pixel is reduced to 1/4. For example, the amount of information to be processed in processing using one channel at a transfer rate of 80M equals that in parallel processing using four channels at a transfer rate of 20M per channel.

In the high-speed processing system using the 4-channel output CCD 34, the data output arrangement as array 3 has four channels. For this reason, array 1 cannot completely equal array 3, unlike the conventional system using the 2-channel output CCD.

The reason why the image data processed in the high-speed scanner control ASIC 135 in the state of array 2 is not directly transferred to the image processing ASIC 84 but converted into the state of array 3 by the raster conversion circuit 165 that constitutes the present invention and then transferred is as follows. As described above, the algorithm of data operations in the series of data processing operations by the image processing ASIC 84 is realized for image data input with the same array as array 1 or a similar data array in the aligned state.

That is, array 2 is an inappropriate data array for the series of data processing operations by the image processing ASIC 84, and array 3 is defined as a data array in the aligned state, which is similar to array 1. In the system using the 4-channel output CCD 34, which is capable of high-speed processing, rearrangement of array 2 to array 3 on the basis of array 1 is defined as arraying, e.g., rearrangement by data operation by the raster conversion circuit 165 that constitutes the present invention, and this is set as interface specifications between the high-speed scanner control ASIC 135 and image processing ASIC 84 in advance.

The arrangement and operation of the raster conversion circuit 165 will be described next.

Figure 10:
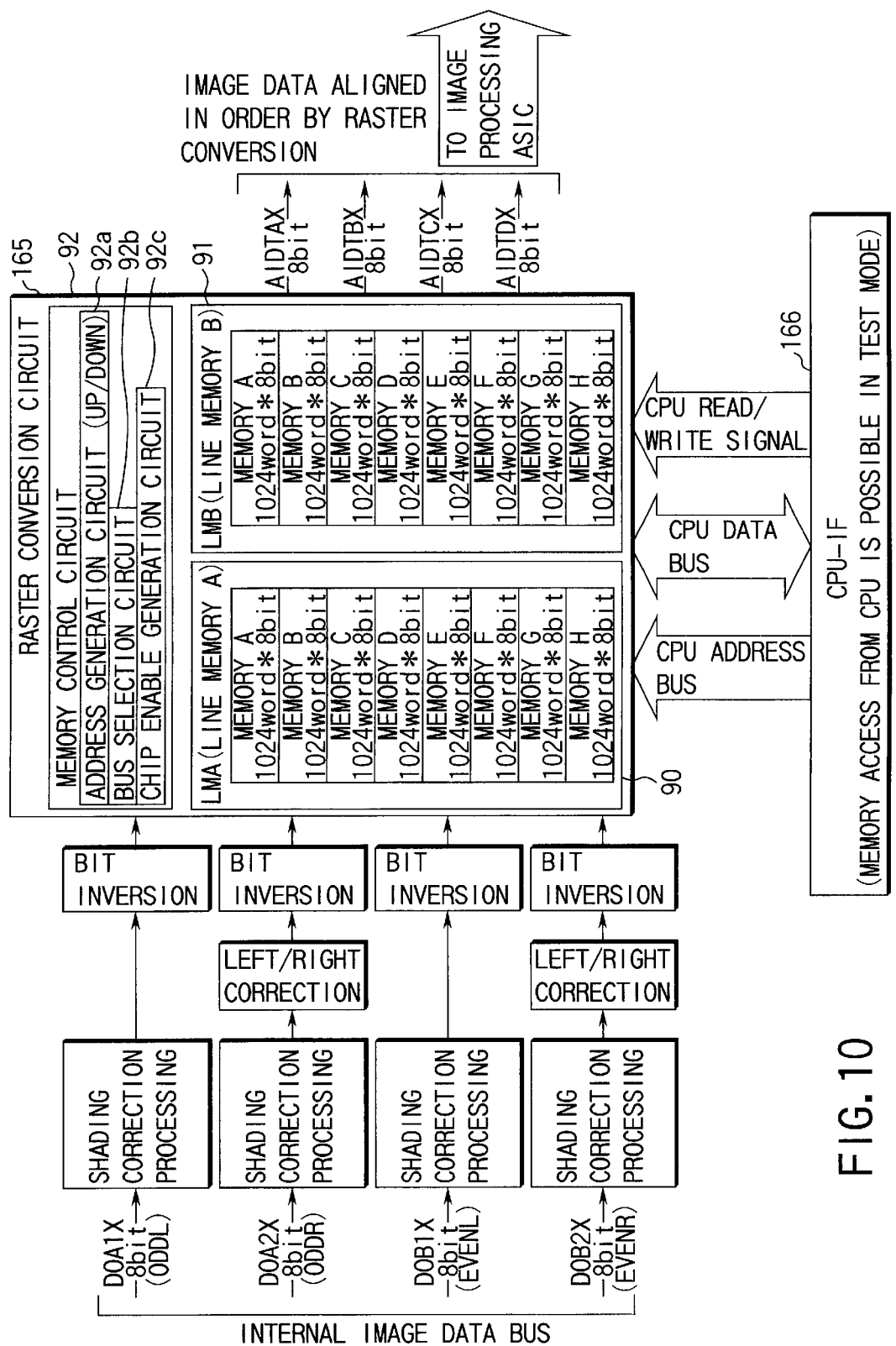
FIG. 10 is a view showing the arrangement of a raster conversion circuit.

FIG. 10 shows the arrangement of the raster conversion circuit 165. The raster conversion circuit 165 comprises a line memory (LMA) 90, a line memory (LMB) 91, and a memory control circuit 92. Each of the line memories 90 and 91 has memories A to H. A CPU-IF circuit 166 for allowing memory access from the basic section CPU (external) 311 is connected to the raster conversion circuit 165.

In raster conversion of the present invention, a data array is operated, i.e., rearrangement is performed by controlling dedicated memories. As the hardware arrangement, as shown in FIG. 10, eight RAMs each having a capacity of 1,024 words (WORD)*8 bits are combined to form one line memory. Two line memories (LMA 90 and LMB 91) are prepared, and the memory control circuit 92 for these memories is used. The memory control circuit 92 comprises an address generation circuit (up and down) 92*a*, a bus selection circuit 92*b*, and a chip enable generation circuit 92*c*.

The capacity of one line memory is 8,192 words. This is because the raster conversion function that constitutes the present invention uses a scheme of processing image data in units of lines, i.e., temporarily storing image data of one line in the memory (data write processing in the memory) and rearranging the data array when the data are output from the memory (data read processing from the memory). The reason why two line memories (LMA 90 and LMB 91) are prepared is that image data are continuously processed in units of lines, i.e., simultaneous and a synchronous data write processing in the memories and data read processing from the memories in units of lines are allowed by alternately accessing these memories. For example, when data write processing in the LMB 90 is being performed, data read processing from the LMA 91 is simultaneously and a synchronously performed.

Actual rearrangement operation will be described next.

The image data (D0A1X, D0A2X, D0BLX, and D0B2X) of four channels are shading-corrected and left/right-corrected in the high-speed scanner control ASIC 135, and transferred to the raster conversion circuit 165 that constitutes the present invention in the bit-inverted state.

Figure 9:
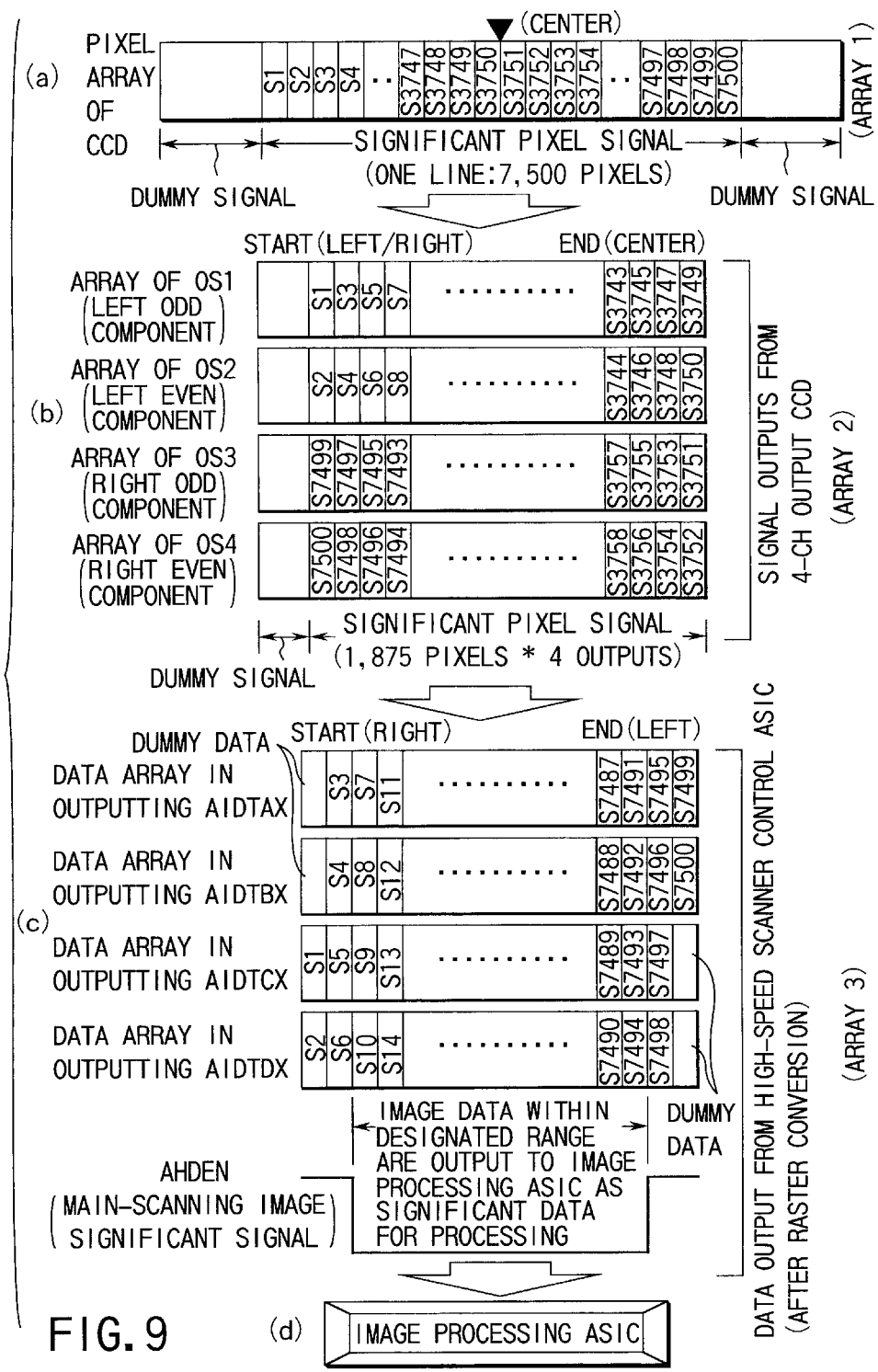
FIG. 9 is a view showing the flow of data array in use of the 4-channel output CCD of the present invention.

The data array at this time is array 2 shown in FIG. 9. These data are stored in the line memories 90 and 91. Memory access operation in data write processing at this time will be described with reference to FIG. 11.

The number of pixel data forming image data of one line to be processed in this embodiment is 7,504 pixels (the number of significant pixels of the CCD: 7,500 pixels+ dummy pixels: 4 pixels). As described above, each of the line memories 90 and 91 combines eight RAMs, i.e., the memories A, B, C, D, E, F, G, and H each having a capacity of 1,024 words*8 bits. Each of the eight memories has independent input and output ports. That is, each of the eight memories can be independently accessed.

Figure 11:
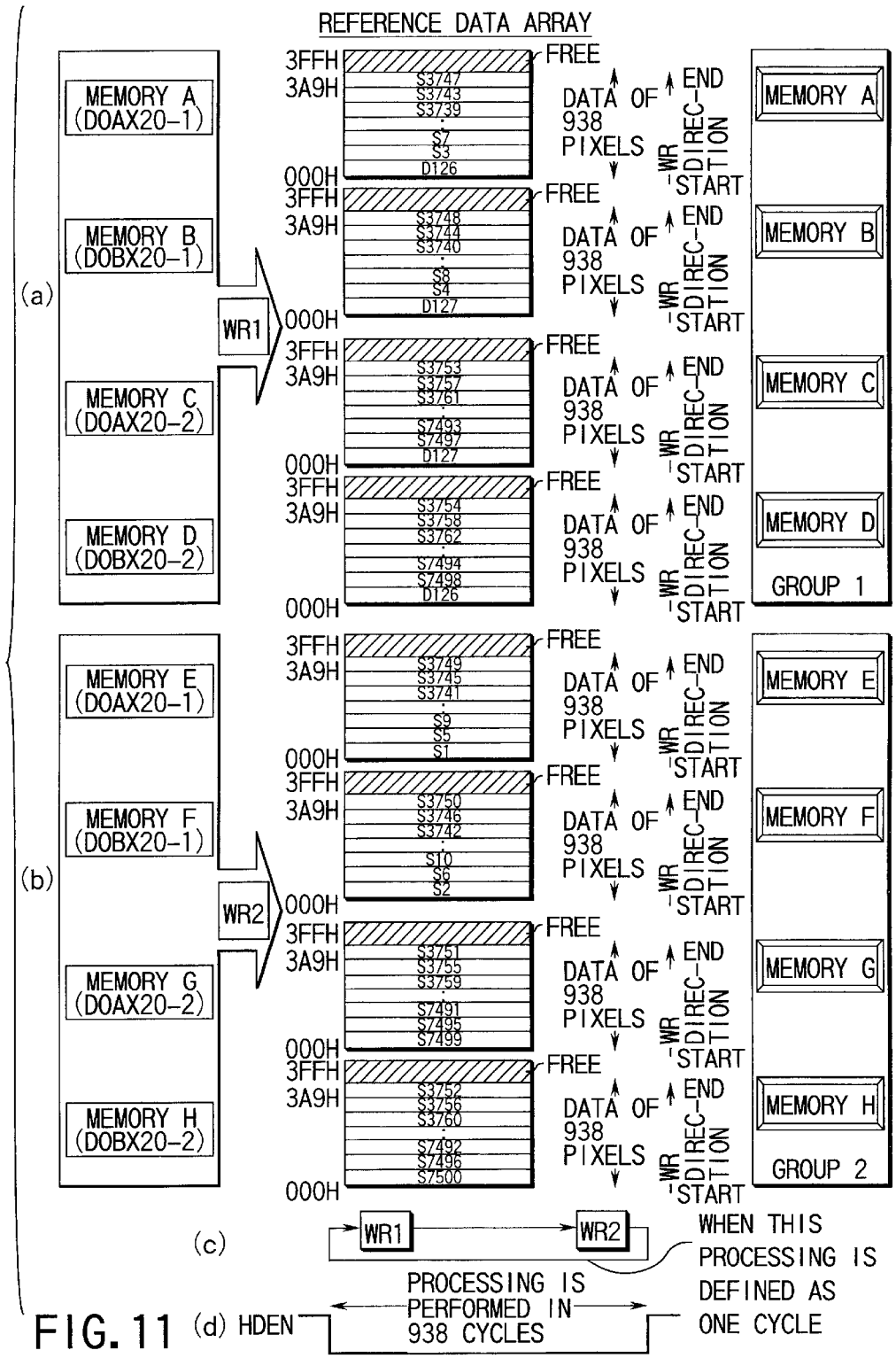
FIG. 11 is a view for explaining memory access operation in data write processing.

The eight memories are put into groups each comprising four memories, as shown in FIG. 11. More specifically, the memories A, B, C, and D are considered as group 1, and the memories E, F, G, and H are considered as group 2. First, using the bus selection circuit 92*b*, the image data buses of four channels are connected to the data input ports of the memories (A, B, C, and D) of group 1. The start pixel data (four dummy data) of the image data of four channels are simultaneously written at addresses 000H of the memories (A, B, C, and D) of group 1. Next, the image data buses of four channels are connected to the data input ports of the memories (E, F, G, and H) of group 2, and the next pixel data of the image data of four channels, i.e., S1, S2, S7499, and S7500 are simultaneously written at addresses 000H of the memories (E, F, G, and H) of group 2.

In this way, the image data buses of four channels are alternately switched between the data input ports of the memories (A, B, C, and D) of group 1 and the data input ports of the memories (E, F, G, and H) of group 2 without pixel data. In addition, pixel data are sequentially written in the memories (A to H) while incrementing the memory address by the address generation circuits 92*a* of group 1 and group 2. This operation is repeated until the final pixel data of the image data are written in the memories (E to H) of group 2.

Figure 12:
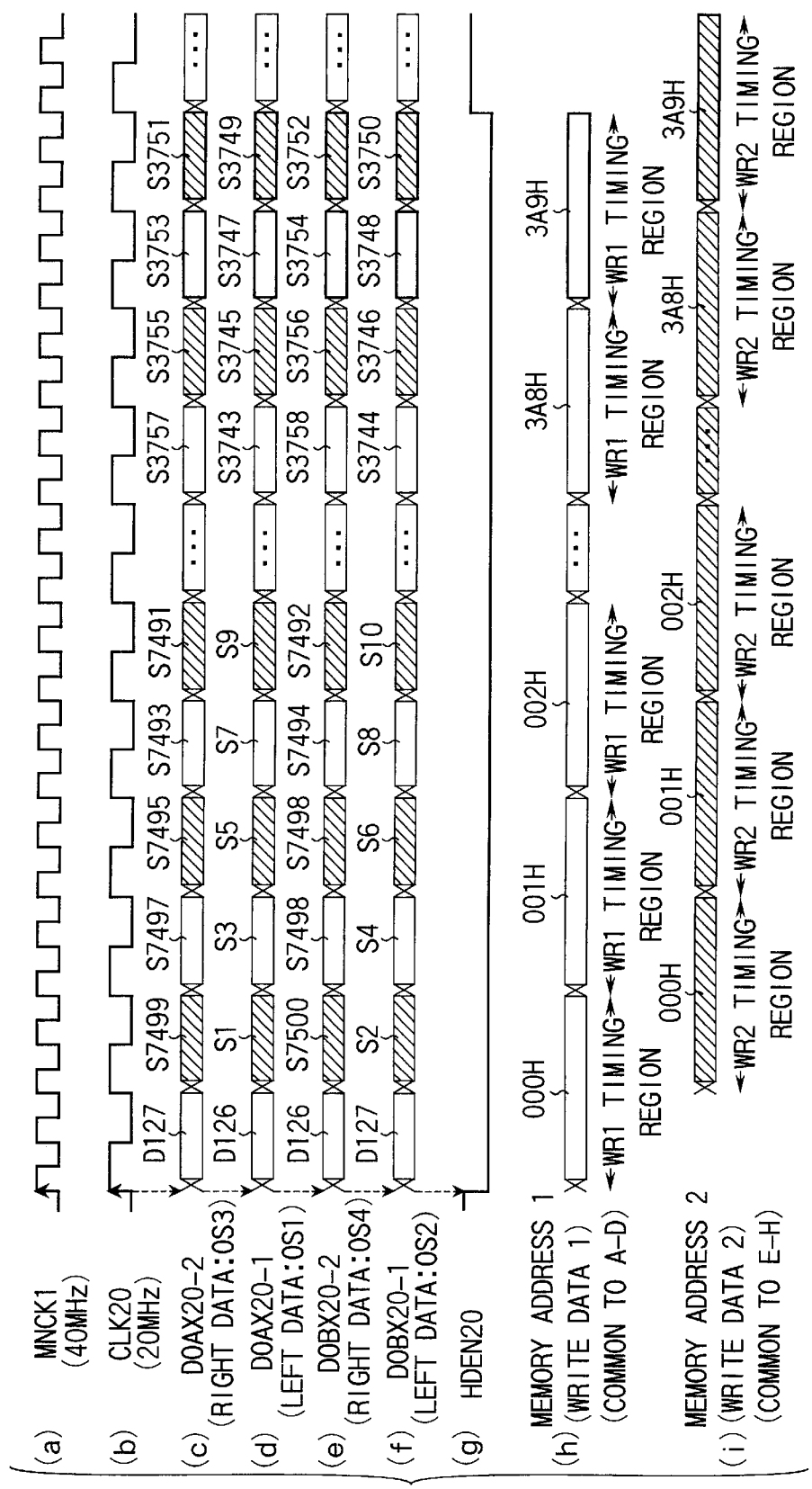
FIG. 12 is a timing chart for explaining memory access operation in data write processing.

FIG. 12 is a timing chart showing this state. As shown in FIG. 12, in this processing, the pixel data of image data of four channels are alternately written in the memories (A, B, C, and D) of group 1 and memories (E, F, G, and H) of group 2 by clock synchronization. White pixel data are data to be written in group 1, and hatched pixel data are data to be written in group 2. As is apparent from this timing chart, when the memories (A, B, C, D, E, F, G, and H) put into two groups are alternately accessed, the memory access speed, i.e., write cycle for one group is 1/2 the image data transfer rate.

That is, the timing margin for the memories in terms of hardware advantageously acts. The write in the memories is triggered by the HDEN (main-scanning image significant signal).

FIG. 11 shows the array state of pixel data in the eight memories A, B, C, D, E, F, G, and H when processing of image data of one line is ended. As is apparent from FIG. 11, 7,504 pixel data forming image data of one line are stored in the eight memories A, B, C, D, E, F, G, and H, and more specifically, left pixel data of even components, right pixel data of even components, left pixel data of odd components, and right pixel data of odd components are independently stored in the memories every four pixels, so each memory stores an equal number of, i.e., 938 pixel data in the space from address 000H to address 3AgH.

When the image data of one line stored in the line memories (90 and 91) are to be output from the memories, memory read control is performed to array the output image data (AIDTAX, AIDTBX, AIDTCX, and AIDTDX) of four channels in order, i.e., in array 3 shown in FIG. 9. Memory access operation in data read processing at this time will be described with reference to FIGS. 13A and 13B.

Figure 13A:
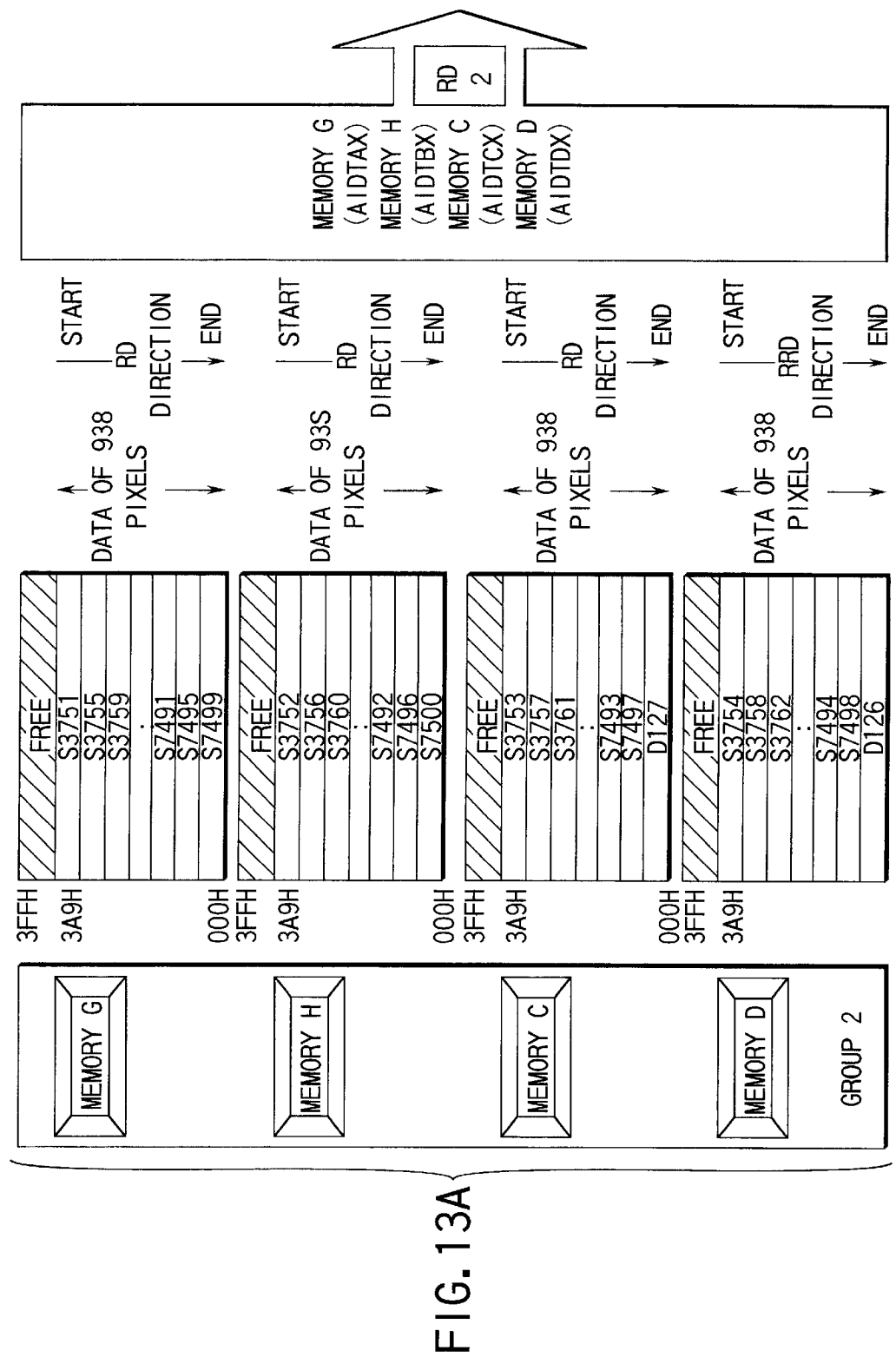
FIGS. 13A and 13B are views for explaining memory access operation in data read processing.
Figure 13B:
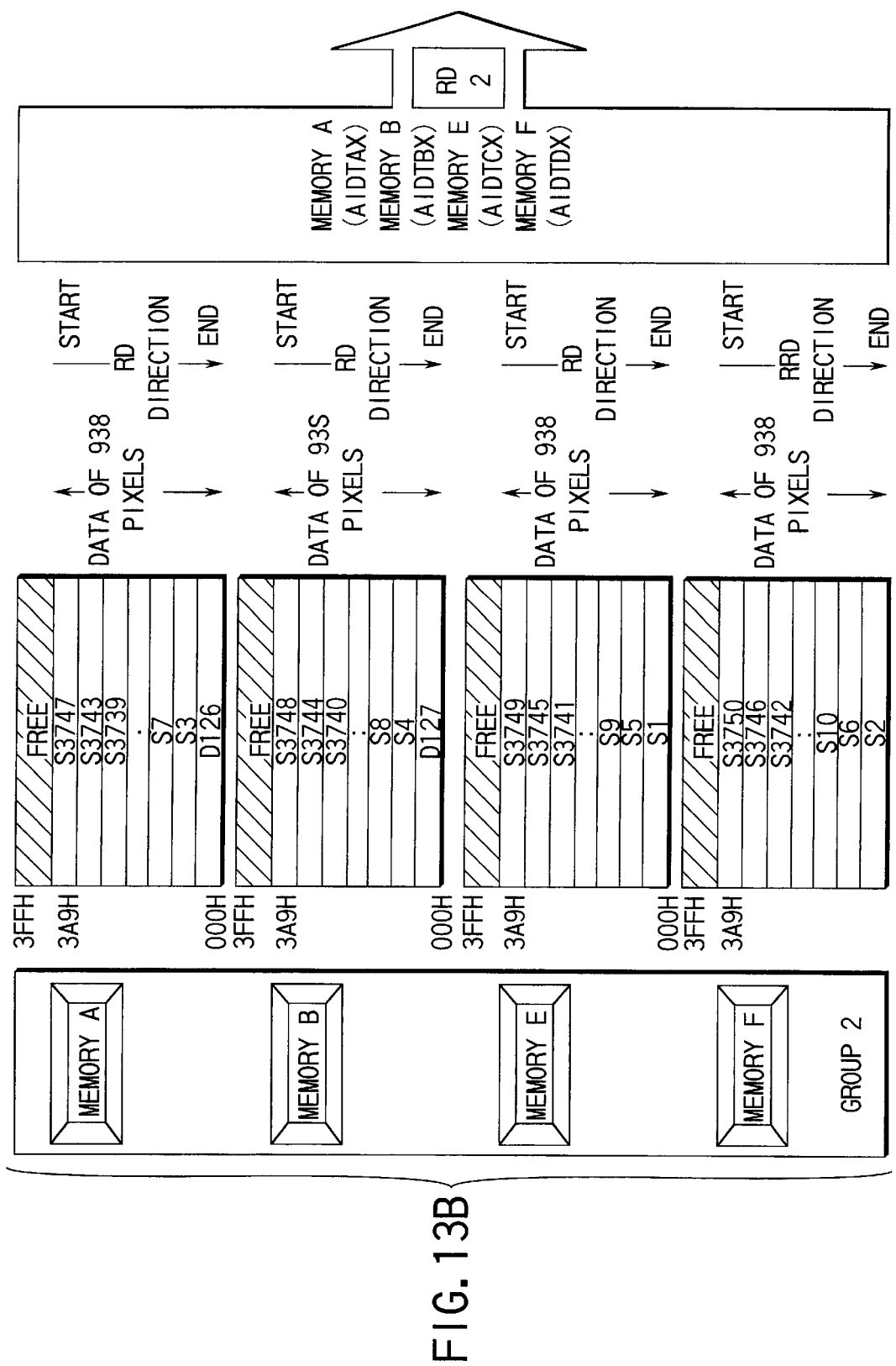

In data read processing as well, the eight memories are put into groups comprising four memories, as in data write processing, though the combinations are different from those in data write processing. As shown in FIGS. 13A and 13B, the memories A, B, E, and F are considered as group 1, and the memories G, H, C, and D are considered as group 2. First, the output image data buses of four channels are connected to the data output ports of the memories (A, B, E, and F) of group 1. Two dummy data and S1 and S2, that are data stored at addresses 000H of the memories (A, B, E, and F) of group 1 are simultaneously read out as the start pixel data of output image data of four channels. Subsequently, data in the memories A, B, E, and F are sequentially read out while incrementing the memory addresses of the memories A, B, E, and F of group 1 by the address generation circuit 92*a* of group 1. When the read of all data stored in the memories (A, B, E, and F) of group 1 is ended, i.e., the read of the data S3747, S3748, S3749, and S3750 at memory addresses 3AgH is ended, connection of the output image data buses of four channels is switched to the data output ports of the memories (G, H, C, and D) of group 2.

Next to the data finally read out from the memories (A, B, E, and F) of group 1, i.e., the data S3747, S3748, S3749, and S3750 at memory addresses 3AgH, data finally written in the memories (G, H, C, and D) 5 of group 2 by data write processing, i.e., data S3751, S3752, S3753, and S3754 at memory addresses 3AgH are read out. Subsequently, data in the memories G, H, C, and D are sequentially read out while decrementing the memory addresses of the memories G, H, C, and D of 10 group 2 by the address generation circuit 92*a* of group 2 from the start addresses 3AgH. Read processing is continued until final data of all data stored in the memories (G, H, C, and D) of group 2, i.e., data S7499 and S7500 and two dummy data at memory addresses 000H are read out.

Figure 14:
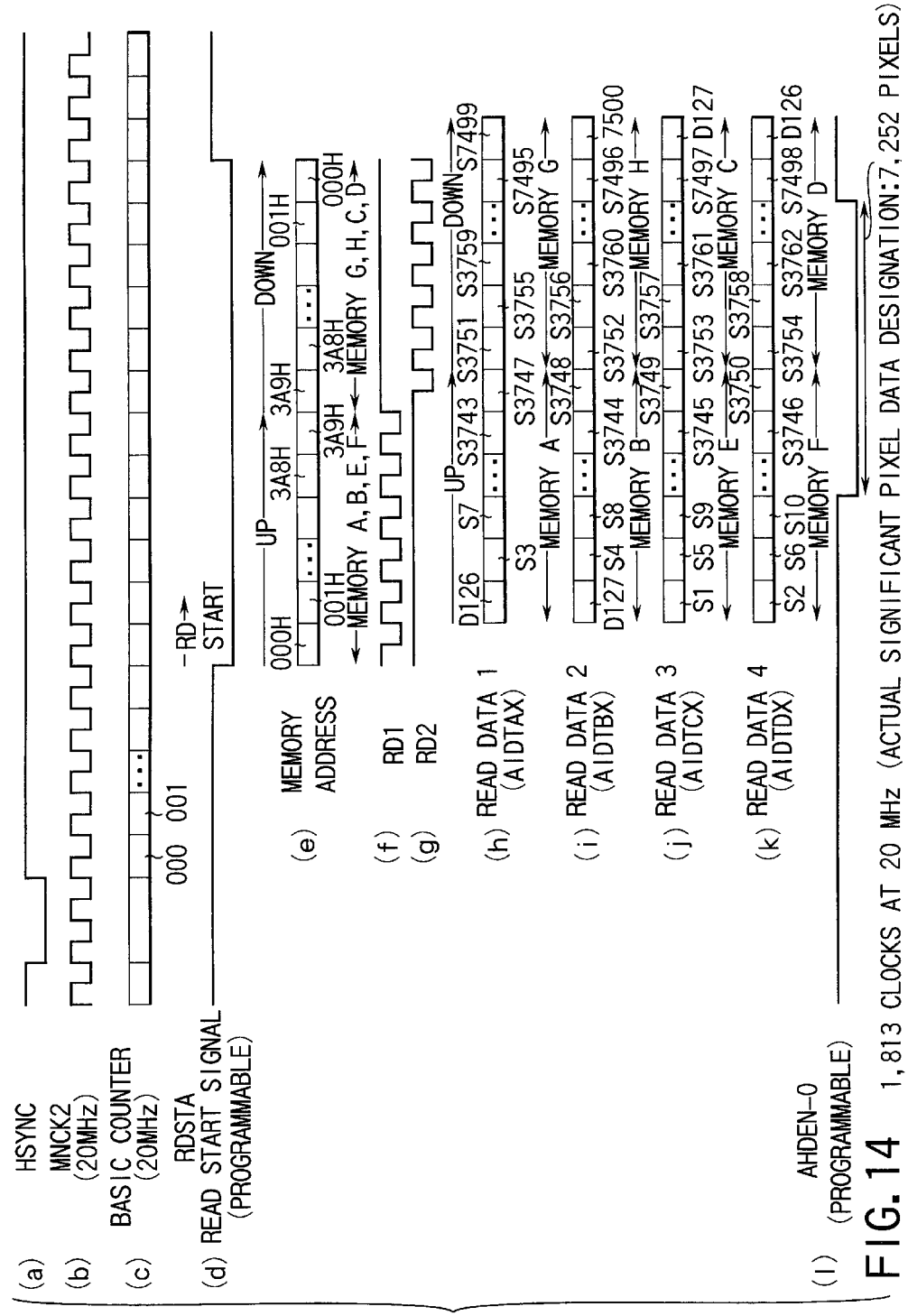
FIG. 14 is a timing chart for explaining memory access operation in data read processing.

FIG. 14 is a timing chart showing this state. As shown in FIG. 14, in this processing, after all data in the memories A, B, E, and F of pixel data group 1 of output image data of four channels are read out, all data in the memories G, H, C, and D of group 2 are read out by clock synchronization. The read from the memories is triggered by the RDSTA (read start signal). When the raster conversion circuit 165 performs data write processing→data read processing using the dedicated memories (LMA 90 and LMB 91), the array of pixel data of image data of one line is operated, and array 2 shown in FIG. 9 is rearranged to array 3.

Since two line memories (LMA 90 and LMB 91) are prepared, and the above processing is alternately performed in the line memories (LMA 90 and LMB 91), the image data can be continuously processed in units of lines.

Image signals output from the 4-channel output CCD 34 are transferred from the high-speed scanner control ASIC 135 to the image processing ASIC 84 as image data converted, i.e., aligned into a data array appropriate for the series of data processing operations by image processing.

As described above, according to the embodiment of the present invention, in the preprocessing system using the 4-channel output CCD, the influence of the difference in signal transmission path (processing path) due to the system arrangement or the internal structure of the chip of the CCD or amplifier, i.e., deviation in circuit characteristics on image data, i.e., the influence of linear deviation in image density on image data can be corrected.

The signal output arrangement of the CCD, i.e., signal outputs from the 4-channel, output CCD can be considered as the order of pixel signals corresponding to, one line of the CCD. In this case, left data of even or odd components are sequentially output starting from the pixel signal at the left end, and the pixel, signal at the center is finally output. Right data of even or odd components are sequentially output starting from the pixel signal at the right end, and the pixel signal at the center is finally output. Hence, the signals which are not aligned in order, i.e., which has an inappropriate array for image processing can be re-arrayed in order to allow continuous processing as in the 2-channel structure.

That is, since an appropriate data array for the subsequent series of data processing operations can be obtained by rearranging the data string by raster processing, subsequent data processing can be smoothly performed even by the 4-channel photoelectric conversion apparatus.

Hence, in the 4-channel photoelectric conversion apparatus which realizes high-speed processing, subsequent data processing can be smoothly performed using data aligned by raster processing.

As has been described above in detail, according to the present invention, a photoelectric conversion apparatus, photoelectric conversion method, image information processing apparatus, image information processing method, and image forming apparatus capable of correcting deviation in image data in association with the image density, that is generated in use of a 4-channel output CCD, and aligning a signal array of image data can be provided.

What is claimed is:

1. A photoelectric conversion apparatus comprising:

photoelectric conversion means, having a plurality of elements formed in a line, for receiving reflected light from an object, photoelectrically converting the light into image signals, and outputting the image signals;

first output means for outputting first image signals received from odd elements from a first end portion to a central portion of said plurality of elements in the line in said photoelectric conversion means;

second output means for outputting second image signals received from even elements from the first end portion to the central portion of said plurality of elements in the line in said photoelectric conversion means;

third output means for outputting third image signals received from odd elements from a second end portion to the central portion of said plurality of elements in the line in said photoelectric conversion means;

fourth output means for outputting fourth image signals received from even elements from the second end portion to the central portion of said plurality of elements in the line in said photoelectric conversion means;

first correction means for correcting one of the first image signal from said first output means, which is located substantially at the center of the line of said photoelectric conversion means and the third image signal from said third output means, which is located substantially at the center of the line of said photoelectric conversion means so as to make the first image signal substantially equal to the third image signal; and second correction means for correcting one of the second image signal from said second output means, which is located substantially at the center of the line of said photoelectric conversion means and the fourth image signal from said fourth output means, which is located substantially at the center of the line of said photoelectric conversion means so as to make the second image signal substantially equal to the fourth image signal.

2. A photoelectric conversion apparatus according to claim 1, wherein said first to fourth output means output the image signals in an order of said first output means, said second output means, said third output means, and said fourth output means.

3. A photoelectric conversion apparatus according to claim 1, wherein each of said first to fourth output means has a corresponding one of a plurality of register circuits for holding the image signals.

4. A photoelectric conversion apparatus according to claim 1, wherein each of said first to fourth output means has a corresponding one of a plurality of register circuits for holding the image signals, rearranging the image signals in a predetermined order, and outputting the image signals.

5. A photoelectric conversion apparatus according to claim 1, wherein said first correction means comprises
third correction means for shading-correcting the first image signal from said first output means and the third image signal from said third output means and correcting one of the shading-corrected first image signal from said first output means, which is located substantially at the center of the line of said photoelectric conversion means and the shading-corrected third image signal from said third output means, which is located substantially at the center of the line of said photoelectric conversion means so as to make the first image signal substantially equal to the third image signal; and wherein said second correction means comprises
fourth correction means for shading-correcting the second image signal from said second output means and the fourth image signal from said fourth output means and correcting one of the shading-corrected second image signal from said second output means, which is located substantially at the center of the line of said photoelectric conversion means and the shading-corrected fourth image signal so as to make the second image signal substantially equal to the fourth image signal.

6. A photoelectric conversion apparatus according to claim 1, characterized by further comprising rearrangement means for rearranging, by raster processing, an order of information of the first image signal, the second image signal, the third image signal, and the fourth image signal, which are corrected by said first correction means and said second correction means.

7. A photoelectric conversion method comprising:

the photoelectric conversion step of receiving reflected light from an object, photoelectrically converting the light into image signals and outputting the image signals using a plurality of elements formed in a line;

the first output step of outputting first image signals received from even elements of said plurality of elements in the line and used in the photoelectric conversion step from a first end portion to a central portion;

the second output step of outputting second image signals received from odd elements of said plurality of elements in the line and used in the photoelectric conversion step from the first end portion to the central portion;

the third output step of outputting third image signals received from even elements of said plurality of elements in the line and used in the photoelectric conversion step from a second end portion to the central portion;

the fourth output step of outputting fourth image signals received from odd elements of said plurality of elements in the line and used in the photoelectric conversion step from the second end portion to the central portion;

the first correction step of correcting one of the first image signal from the first output step, which is located substantially at the center of the line of the photoelectric conversion step and the third image signal from the third output step, which is located substantially at the center of the line of the photoelectric conversion step so as to make the first image signal substantially equal to the third image signal; and the second correction step of correcting one of the second image signal from the second output step, which is located substantially at the center of the line of the photoelectric conversion step and the fourth image signal from the fourth output step, which is located substantially at the center of the line of the photoelectric conversion step so as to make the second image signal substantially equal to the fourth image signal.

* * * * *